(12) United States Patent
Xue et al.

(10) Patent No.: US 11,800,491 B2
(45) Date of Patent: Oct. 24, 2023

(54) RESOURCE POOL-BASED COMMUNICATIONS FOR SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Junyi Li, Fairless Hills, PA (US); Ozcan Ozturk, San Diego, CA (US); Chih-Hao Liu, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/382,681

(22) Filed: Jul. 22, 2021

(65) Prior Publication Data

US 2022/0070825 A1    Mar. 3, 2022

Related U.S. Application Data

(60) Provisional application No. 63/069,947, filed on Aug. 25, 2020.

(51) Int. Cl.
| | |
|---|---|
| *H04W 72/02* | (2009.01) |
| *H04W 72/0446* | (2023.01) |
| *H04W 28/26* | (2009.01) |
| *H04W 72/0453* | (2023.01) |
| *H04W 72/21* | (2023.01) |

(52) U.S. Cl.
CPC .......... *H04W 72/02* (2013.01); *H04W 28/26* (2013.01); *H04W 72/0446* (2013.01); *H04W 72/0453* (2013.01); *H04W 72/21* (2023.01)

(58) Field of Classification Search
CPC . H04W 72/02; H04W 28/26; H04W 72/0446; H04W 72/0453; H04W 72/21; H04W 72/20
See application file for complete search history.

(56) References Cited

U.S. PATENT DOCUMENTS

| | | | | |
|---|---|---|---|---|
| 2007/0165557 A1* | 7/2007 | Donovan | .............. | H04W 48/00 370/318 |
| 2009/0168714 A1* | 7/2009 | Tanaka | .................. | H04L 1/1893 370/329 |
| 2012/0307773 A1* | 12/2012 | Tiirola | .................. | H04L 1/1671 370/329 |
| 2014/0092802 A1* | 4/2014 | Sugimoto | ........... | H04W 74/085 370/312 |
| 2019/0357305 A1* | 11/2019 | Su | ......................... | H04W 88/04 |

(Continued)

*Primary Examiner* — Christine Ng
(74) *Attorney, Agent, or Firm* — Holland & Hart LLP

(57) ABSTRACT

Methods, systems, and devices for wireless communications are described. The method includes receiving, from a second UE, a configuration for receipt of a sidelink resource pool message, determining that the first UE has information to be transmitted to the second UE via sidelink communications, receiving, in accordance with the configuration, the sidelink resource pool message, identifying, based on the sidelink resource pool message, a resource pool that includes sub-channels for sidelink communications to the second UE, and attempting to access a sub-channel of the resource pool in order to transmit the information to the second UE via sidelink communications.

29 Claims, 16 Drawing Sheets

(56) References Cited

U.S. PATENT DOCUMENTS

| | | | | |
|---|---|---|---|---|
| 2020/0092685 A1* | 3/2020 | Fehrenbach | .......... | H04W 72/23 |
| 2020/0351669 A1* | 11/2020 | Xu | .......... | H04W 72/56 |
| 2020/0383094 A1* | 12/2020 | Chae | .......... | H04L 1/1893 |
| 2021/0007096 A1* | 1/2021 | Huang | .......... | H04W 72/20 |
| 2021/0105104 A1* | 4/2021 | Cao | .......... | H04L 1/1819 |
| 2021/0204250 A1* | 7/2021 | Ashraf | .......... | H04W 72/20 |
| 2021/0219350 A1* | 7/2021 | Wu | .......... | H04L 69/324 |
| 2021/0243749 A1* | 8/2021 | Hoang | .......... | H04W 28/26 |
| 2021/0250954 A1* | 8/2021 | Li | .......... | H04L 5/0094 |
| 2021/0266868 A1* | 8/2021 | Shin | .......... | H04L 5/0094 |
| 2022/0077991 A1* | 3/2022 | Hwang | .......... | H04L 5/0053 |
| 2022/0078760 A1* | 3/2022 | Su | .......... | H04W 72/20 |
| 2022/0225292 A1* | 7/2022 | Mohammad Soleymani | .......... | H04L 5/0053 |
| 2023/0057174 A1* | 2/2023 | Guo | .......... | H04W 72/542 |

* cited by examiner

RESOURCE POOL-BASED COMMUNICATIONS FOR SIDELINK

CROSS REFERENCE

The present Application for Patent claims the benefit of U.S. Provisional Patent Application No. 63/069,947 by Xue et al., entitled "REVERSE LINK COMMUNICATIONS FOR SIDELINK," filed Aug. 25, 2020, assigned to the assignee hereof, and expressly incorporated by reference herein.

FIELD OF TECHNOLOGY

The following relates to wireless communications, including reverse link communications for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as 4G and 5G systems, may support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, cellular V2X (C-V2X) communications systems, and the like. As demand for communication efficiency increases, it may be desirable for some wireless communications systems, such as 4G and 5G systems, to provide improvements to sidelink communications to support higher reliability and low latency sidelink operations, among other examples.

SUMMARY

The described techniques relate to improved methods, systems, devices, and apparatuses that support resource pool-based communications for sidelink. Generally, the described techniques provide for a sidelink peripheral user equipment (UE) to occupy a sub-channel without the sidelink peripheral UE performing channel sensing.

In some examples, a first UE (such as a peripheral UE) may receive, from a second UE (such as a hub UE), a configuration for receipt of a sidelink resource pool message. In some cases, the second UE may identify a resource pool that includes sub-channels for sidelink communications to the second UE, configure the sidelink resource pool message that indicates the resource pool, and transmit the sidelink resource pool message to the first UE. In some cases, the second UE may transmit the sidelink resource pool message to the first UE via groupcast. In some cases, the first UE may determine that the first UE has information to be transmitted to the second UE via sidelink communications. In some cases, the first UE may receive, in accordance with the configuration, the sidelink resource pool message. In some cases, the first UE may identify, based on the sidelink resource pool message, a resource pool that includes sub-channels for sidelink communications to the second UE. In some cases, the first UE may attempt to access a sub-channel of the resource pool in order to transmit the information to the second UE via sidelink communications. In some cases, the first UE may access the sub-channel of the resource pool and transmit the information to the second UE via the sidelink communications.

A method of wireless communications at a first UE is described. The method may include receiving, from a second UE, a configuration for receipt of a sidelink resource pool message, determining that the first UE has information to be transmitted to the second UE via sidelink communications, receiving, in accordance with the configuration, the sidelink resource pool message, identifying, based on the sidelink resource pool message, a resource pool that includes sub-channels for sidelink communications to the second UE, and attempting to access a sub-channel of the resource pool in order to transmit the information to the second UE via sidelink communications.

An apparatus for wireless communications at a first UE is described. The apparatus may include a processor, memory coupled with the processor, and instructions stored in the memory. The instructions may be executable by the processor to cause the apparatus to receive, from a second UE, a configuration for receipt of a sidelink resource pool message, determine that the first UE has information to be transmitted to the second UE via sidelink communications, receive, in accordance with the configuration, the sidelink resource pool message, identify, based on the sidelink resource pool message, a resource pool that includes sub-channels for sidelink communications to the second UE, and attempt to access a sub-channel of the resource pool in order to transmit the information to the second UE via sidelink communications.

Another apparatus for wireless communications at a first UE is described. The apparatus may include means for receiving, from a second UE, a configuration for receipt of a sidelink resource pool message, determining that the first UE has information to be transmitted to the second UE via sidelink communications, receiving, in accordance with the configuration, the sidelink resource pool message, identifying, based on the sidelink resource pool message, a resource pool that includes sub-channels for sidelink communications to the second UE, and attempting to access a sub-channel of the resource pool in order to transmit the information to the second UE via sidelink communications.

A non-transitory computer-readable medium storing code for wireless communications at a first UE is described. The code may include instructions executable by a processor to receive, from a second UE, a configuration for receipt of a sidelink resource pool message, determine that the first UE has information to be transmitted to the second UE via sidelink communications, receive, in accordance with the configuration, the sidelink resource pool message, identify, based on the sidelink resource pool message, a resource pool that includes sub-channels for sidelink communications to the second UE, and attempt to access a sub-channel of the resource pool in order to transmit the information to the second UE via sidelink communications.

In some examples of the method, apparatuses, and non-transitory computer-readable medium described herein, receiving the sidelink resource pool message may include operations, features, means, or instructions for receiving the sidelink resource pool message via at least one of first stage sidelink control information, second stage sidelink control information, a media access control element, or downlink control information.

In some examples of the method, apparatuses, and non-transitory computer-readable medium described herein, receiving the sidelink resource pool message may include operations, features, means, or instructions for receiving a first stage sidelink control information compatible with legacy UEs and a second stage sidelink control information that may be indicative of a random access process for accessing the sub-channel of the resource pool.

In some examples of the method, apparatuses, and non-transitory computer-readable medium described herein, receiving the sidelink resource pool message may include operations, features, means, or instructions for receiving a first stage sidelink control information that either includes one or more bits or may be scrambled with bits that may be indicative of a random access process for accessing the sub-channel of the resource pool.

In some examples of the method, apparatuses, and non-transitory computer-readable medium described herein, receiving the first stage sidelink control information may include operations, features, means, or instructions for receiving the first stage sidelink control information within a portion (e.g., only a portion) of a receiving sub-channel or with a coding rate or a transmission power that may be below a threshold, or any combination thereof.

Some examples of the method, apparatuses, and non-transitory computer-readable medium described herein may further include operations, features, means, or instructions for transmitting the information to the second UE over the sub-channel of the resource pool via sidelink communications, and entering a low-power mode after transmitting the information.

Some examples of the method, apparatuses, and non-transitory computer-readable medium described herein may further include operations, features, means, or instructions for transmitting, over the sub-channel of the resource pool and via sidelink communications, the information multiplexed with a status report or buffer status report, where the status report or the buffer status report includes a request for the second UE to provide additional schedule transmission opportunities to the first UE.

Some examples of the method, apparatuses, and non-transitory computer-readable medium described herein may further include operations, features, means, or instructions for monitoring for the sidelink resource pool message from the second UE during a periodic window, where the configuration may be indicative of the periodic window.

In some examples of the method, apparatuses, and non-transitory computer-readable medium described herein, the periodic window includes a predetermined window length and a predetermined periodicity.

In some examples of the method, apparatuses, and non-transitory computer-readable medium described herein, identifying the resource pool may include operations, features, means, or instructions for identifying that the sidelink resource pool message indicates random access resources to be used by the first UE in transmitting the information to the second UE, where the information may be data, control information, or both.

In some examples of the method, apparatuses, and non-transitory computer-readable medium described herein, receiving the sidelink resource pool message may include operations, features, means, or instructions for receiving the sidelink resource pool message over an unlicensed band.

In some examples of the method, apparatuses, and non-transitory computer-readable medium described herein, receiving the sidelink resource pool message may include operations, features, means, or instructions for receiving an indication of a locally-defined granularity of the resource pool, where the locally-defined granularity includes a time domain granularity or a frequency domain granularity of sub-channels in the resource pool that differs from a network-defined granularity.

In some examples of the method, apparatuses, and non-transitory computer-readable medium described herein, the sub-channels of the resource pool include M sub-channels.

In some examples of the method, apparatuses, and non-transitory computer-readable medium described herein, attempting to access the sub-channel of the resource pool may include operations, features, means, or instructions for randomly selecting an integer between 1 and M to access the sub-channel from the M sub-channels that corresponds to the randomly selected integer.

In some examples of the method, apparatuses, and non-transitory computer-readable medium described herein, attempting to access the sub-channel of the resource pool may include operations, features, means, or instructions for randomly selecting an integer between 1 and N, where the sidelink resource pool message indicates a value for N that may be greater than M based on a contention window access protocol.

In some examples of the method, apparatuses, and non-transitory computer-readable medium described herein, the sub-channel corresponds to the randomly selected integer when the randomly selected integer may be less than or equal to M.

In some examples of the method, apparatuses, and non-transitory computer-readable medium described herein, the sub-channel corresponds to the randomly selected integer when the randomly selected integer may be less than or equal to M.

Some examples of the method, apparatuses, and non-transitory computer-readable medium described herein may further include operations, features, means, or instructions for calculating a difference of the randomly selected integer and M when the randomly selected integer may be greater than M, and using the calculated difference as an updated contention window for access in a subsequent resource pool.

Some examples of the method, apparatuses, and non-transitory computer-readable medium described herein may further include operations, features, means, or instructions for increasing a value of N based on an observed or predicted congestion over the resource pool, and selecting a non-zero integer N' for a re-entry UE.

Some examples of the method, apparatuses, and non-transitory computer-readable medium described herein may further include operations, features, means, or instructions for randomly selecting an integer between 1 and N', and adding the randomly selected integer to a current contention window.

In some examples of the method, apparatuses, and non-transitory computer-readable medium described herein, receiving the sidelink resource pool message may include operations, features, means, or instructions for receiving an indication of a second resource pool that includes sub-channels that may be available for access subsequent to the sub-channels of the resource pool, where the second resource pool occupies more sub-channels than the resource pool, and where the first UE attempts to access the sub-channel of the second resource pool by transmitting sidelink control information and a physical sidelink shared channel over sub-channels of the second resource pool.

In some examples of the method, apparatuses, and non-transitory computer-readable medium described herein, receiving the sidelink resource pool message may include operations, features, means, or instructions for receiving an indication of a second resource pool that includes local sub-channels that may be available for access subsequent to an availability of the sub-channels of the resource pool, where a quantity of the local sub-channels exceeds a quantity of the sub-channels of the resource pool.

In some examples of the method, apparatuses, and non-transitory computer-readable medium described herein, the sidelink resource pool message includes a system frame number, and where the local sub-channels occupy sub-channels of a physical sidelink shared channel reserved by the second UE.

Some examples of the method, apparatuses, and non-transitory computer-readable medium described herein may further include operations, features, means, or instructions for transmitting a first stage sidelink control information to occupy a local sub-channel of the second resource pool.

In some examples of the method, apparatuses, and non-transitory computer-readable medium described herein, the resource pool occupies resources of a first physical sidelink shared channel reserved by the second UE and resources of a second physical sidelink shared channel reserved by the second UE.

In some examples of the method, apparatuses, and non-transitory computer-readable medium described herein, the sidelink communications indicates the resource pool and a second resource pool, where the resource pool occupies resources of a first physical sidelink shared channel reserved by the second UE and the second resource pool occupies resources of a second physical sidelink shared channel reserved by the second UE.

In some examples of the method, apparatuses, and non-transitory computer-readable medium described herein, the sidelink communications includes a reservation for a first physical sidelink shared channel and a reservation for a second physical sidelink shared channel, and where a sidelink communication from the first UE includes a reservation for the second physical sidelink shared channel.

In some examples of the method, apparatuses, and non-transitory computer-readable medium described herein, the sidelink resource pool message includes a reverse sidelink resource pool message that indicates the resource pool that includes sub-channels for reverse sidelink communications from the first UE to the second UE, and the resource pool includes non-orthogonal resources.

In some examples of the method, apparatuses, and non-transitory computer-readable medium described herein, the configuration includes a star topology configuration that includes the second UE configured as an information source for multiple peripheral UEs that include the first UE.

A method of wireless communications at a second UE in sidelink communication with a first UE is described. The method may include identifying a resource pool that includes sub-channels for sidelink communications to the second UE, configuring a sidelink resource pool message that indicates the resource pool, and transmitting, via groupcast to the first UE, the sidelink resource pool message.

An apparatus for wireless communications at a second UE in sidelink communication with a first UE is described. The apparatus may include a processor, memory coupled with the processor, and instructions stored in the memory. The instructions may be executable by the processor to cause the apparatus to identify a resource pool that includes sub-channels for sidelink communications to the second UE, configure a sidelink resource pool message that indicates the resource pool, and transmit, via groupcast to the first UE, the sidelink resource pool message.

Another apparatus for wireless communications at a second UE in sidelink communication with a first UE is described. The apparatus may include means for identifying a resource pool that includes sub-channels for sidelink communications to the second UE, configuring a sidelink resource pool message that indicates the resource pool, and transmitting, via groupcast to the first UE, the sidelink resource pool message.

A non-transitory computer-readable medium storing code for wireless communications at a second UE in sidelink communication with a first UE is described. The code may include instructions executable by a processor to identify a resource pool that includes sub-channels for sidelink communications to the second UE, configure a sidelink resource pool message that indicates the resource pool, and transmit, via groupcast to the first UE, the sidelink resource pool message.

In some examples of the method, apparatuses, and non-transitory computer-readable medium described herein, transmitting the sidelink resource pool message may include operations, features, means, or instructions for transmitting the sidelink resource pool message via at least one of first stage sidelink control information, second stage sidelink control information, a media access control element, or downlink control information.

In some examples of the method, apparatuses, and non-transitory computer-readable medium described herein, transmitting the sidelink resource pool message may include operations, features, means, or instructions for transmitting a first stage sidelink control information compatible with legacy UEs and a second stage sidelink control information that may be indicative of a random access process for accessing the sub-channel of the resource pool.

In some examples of the method, apparatuses, and non-transitory computer-readable medium described herein, transmitting the sidelink resource pool message may include operations, features, means, or instructions for transmitting a first stage sidelink control information that either includes one or more bits or may be scrambled with bits that may be indicative of a random access process for accessing the sub-channel of the resource pool.

In some examples of the method, apparatuses, and non-transitory computer-readable medium described herein, transmitting the first stage sidelink control information may include operations, features, means, or instructions for transmitting the first stage sidelink control information within a portion (e.g., only a portion) of a receiving sub-channel or with a coding rate or a transmission power that may be below a threshold, or any combination thereof.

Some examples of the method, apparatuses, and non-transitory computer-readable medium described herein may further include operations, features, means, or instructions for receiving information from the first UE over a sub-channel of the resource pool via sidelink communications.

Some examples of the method, apparatuses, and non-transitory computer-readable medium described herein may further include operations, features, means, or instructions for receiving, over a sub-channel of the resource pool and via sidelink communications, information from the first UE that may be multiplexed with a status report or buffer status report, where the status report or the buffer status report includes a request for the second UE to provide additional schedule transmission opportunities to the first UE.

Some examples of the method, apparatuses, and non-transitory computer-readable medium described herein may further include operations, features, means, or instructions for transmitting, to the first UE, a configuration for receipt of the sidelink resource pool message, where the configuration indicates a periodic window during which the sidelink resource pool message may be transmitted.

In some examples of the method, apparatuses, and non-transitory computer-readable medium described herein, the periodic window includes a predetermined window length and a predetermined periodicity.

In some examples of the method, apparatuses, and non-transitory computer-readable medium described herein, the sidelink communications specifies a random access process for the first UE to access a sub-channel of the resource pool to transmit data or control information, or both.

In some examples of the method, apparatuses, and non-transitory computer-readable medium described herein, transmitting the sidelink resource pool message may include operations, features, means, or instructions for transmitting the sidelink resource pool message over an unlicensed band.

In some examples of the method, apparatuses, and non-transitory computer-readable medium described herein, transmitting the sidelink resource pool message may include operations, features, means, or instructions for transmitting an indication of a locally-defined granularity of the resource pool, where the locally-defined granularity includes a time domain granularity or a frequency domain granularity of sub-channels in the resource pool that differs from a network-defined granularity.

In some examples of the method, apparatuses, and non-transitory computer-readable medium described herein, transmitting the sidelink resource pool message may include operations, features, means, or instructions for transmitting an indication of a second resource pool that includes sub-channels that may be available for access subsequent to the sub-channels of the resource pool, where the second resource pool occupies more sub-channels than the resource pool.

In some examples of the method, apparatuses, and non-transitory computer-readable medium described herein, transmitting the sidelink resource pool message may include operations, features, means, or instructions for transmitting an indication of a second resource pool that includes local sub-channels that may be available for access subsequent to an availability of the sub-channels of the resource pool, where a quantity of the local sub-channels exceeds a quantity of the sub-channels of the resource pool.

In some examples of the method, apparatuses, and non-transitory computer-readable medium described herein, the sidelink resource pool message includes a system frame number, and where the local sub-channels occupy sub-channels of a physical sidelink shared channel reserved by the second UE.

In some examples of the method, apparatuses, and non-transitory computer-readable medium described herein, the resource pool occupies resources of a first physical sidelink shared channel reserved by the second UE and resources of a second physical sidelink shared channel reserved by the second UE.

In some examples of the method, apparatuses, and non-transitory computer-readable medium described herein, the sidelink communications indicates the resource pool and a second resource pool, where the resource pool occupies resources of a first physical sidelink shared channel reserved by the second UE and the second resource pool occupies resources of a second physical sidelink shared channel reserved by the second UE.

In some examples of the method, apparatuses, and non-transitory computer-readable medium described herein, the sidelink communications includes a reservation for a first physical sidelink shared channel and a reservation for a second physical sidelink shared channel, and where a sidelink communication from the first UE includes a reservation for the second physical sidelink shared channel.

In some examples of the method, apparatuses, and non-transitory computer-readable medium described herein, the sidelink resource pool message includes a reverse sidelink resource pool message that indicates the resource pool that includes sub-channels for reverse sidelink communications from the first UE to the second UE, and the resource pool includes non-orthogonal resources.

In some examples of the method, apparatuses, and non-transitory computer-readable medium described herein, the configuration includes a star topology configuration that includes the second UE configured as an information source for multiple peripheral UEs that include the first UE.

DETAILED DESCRIPTION

Figure 1:
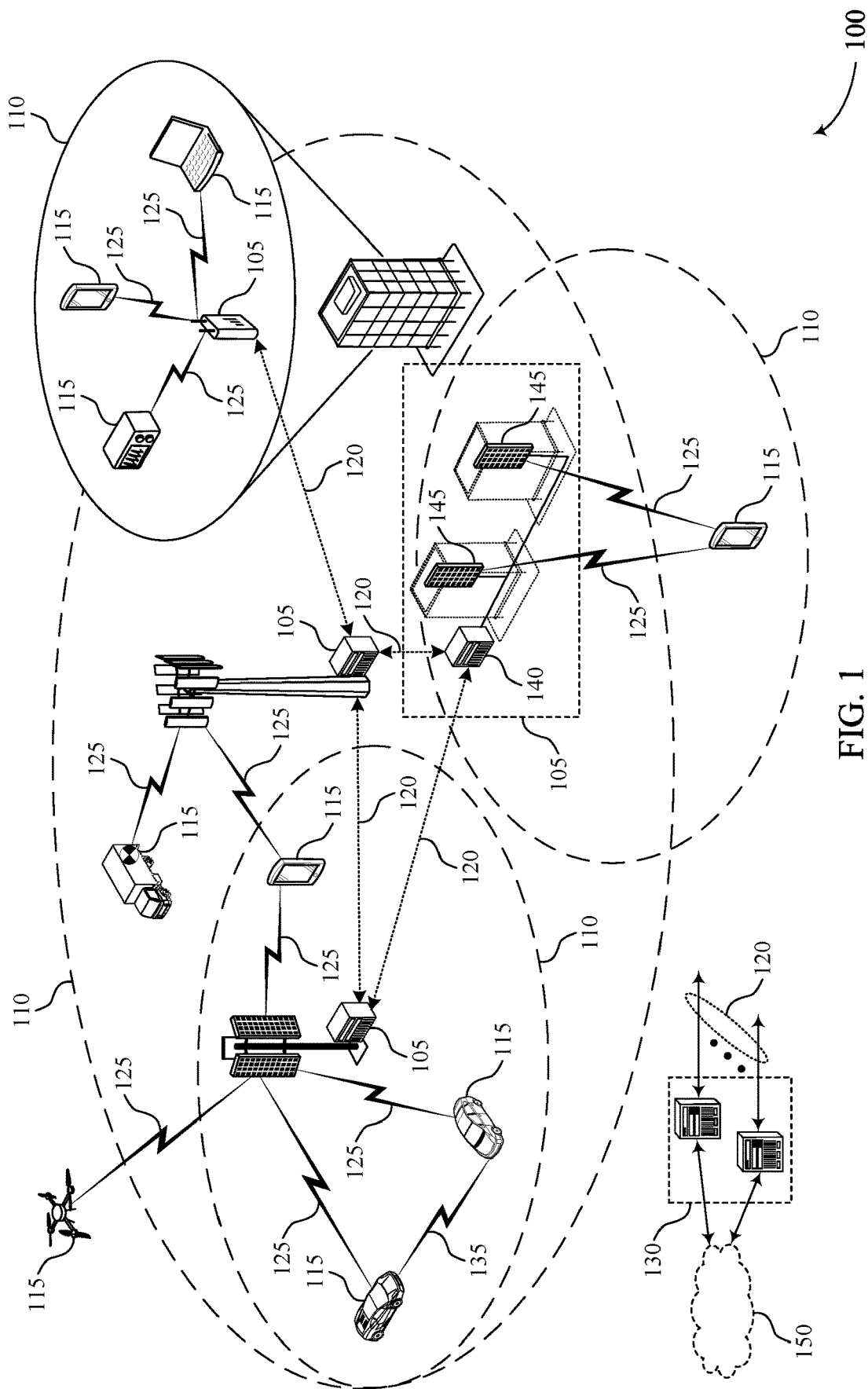
FIG. 1 illustrates an example of a system for wireless communications that supports resource pool-based communications for sidelink in accordance with aspects of the present disclosure.

Some wireless communications systems, such as 4G, 5G, and new radio (NR) systems, may support sidelink communications between multiple communication devices such as vehicle to everything (V2X), peer-to-peer user equipment (UE), etc. To support peer-to-peer transmissions of messages, a sidelink transmitter (e.g., a hub UE) may use a sidelink control information (SCI) to occupy one or multiple sidelink sub-channels to transmit a physical sidelink shared channel. SCI may include first stage SCI over physical sidelink control channel (e.g., for occupancy/reservation of sub-channels) and second stage SCI over physical sidelink shared channel (e.g., for further control information for targeted receivers). However, the designs of some NR sidelink systems do not take device power savings into consideration because many V2X modems are not designed to rely on battery power.

In some examples, a first UE may receive a configuration for receipt of a sidelink resource pool message from a second UE. The first UE may determine that the first UE has information to be transmitted to the second UE via sidelink communications (e.g., sidelink communications from the first UE to the second UE). The second UE may identify a resource pool that includes sub-channels for sidelink communications from the first UE to the second UE. The second UE may configure a sidelink resource pool message that indicates the resource pool and transmit the sidelink resource pool message to the first UE (e.g., via groupcast). The first UE may receive, in accordance with the configuration, the sidelink resource pool message. The first UE may identify, based on the sidelink resource pool message, a resource pool that includes sub-channels for sidelink communications from the first UE to the second UE. The first UE may attempt to access a sub-channel of the resource pool in order to transmit the information to the second UE via sidelink communications.

The present techniques include supporting star topology in NR sidelink systems to provide power savings over reverse link communications (e.g., from peripheral UE to hub UE). When going beyond the V2X use case, NR sidelink may include additional optimization to support additional network topologies and traffic delivery (e.g., star topology, other than peer-to-peer, etc.). The present techniques may include adapting NR sidelink to a star topology where a hub UE is configured as an information source, information sink, or both, for multiple peripheral UEs.

In some examples, a first UE (e.g., peripheral UE) may receive a configuration for receipt of a reverse sidelink resource pool message from a second UE (e.g., hub UE). The first UE may determine that the first UE has information to be transmitted to the second UE via reverse sidelink communications (e.g., sidelink communications from a peripheral UE to a hub UE). The second UE may identify a resource pool that includes sub-channels for reverse sidelink communications from the first UE to the second UE. The second UE may configure a reverse sidelink resource pool message that indicates the resource pool and transmit the reverse sidelink resource pool message to the first UE (e.g., via groupcast). The first UE may receive, in accordance with the configuration, the reverse sidelink resource pool message. The first UE may identify, based on the reverse sidelink resource pool message, a resource pool that includes sub-channels for reverse sidelink communications from the first UE to the second UE. The first UE may attempt to access a sub-channel of the resource pool in order to transmit the information to the second UE via reverse sidelink communications.

In some examples, the present techniques may provide at least two radio resource allocation (RRA) schemes that include mode 1 and mode 2. In some cases, mode 1 or first stage may be used for network controlled deployment, where a sidelink transmitter receives a grant from a base station for channel access. In some cases, mode 2 or second stage may be used for standalone deployment, where a sidelink transmitter performs channel sensing to autonomously occupy/reserve channel access. In some cases, full sensing (e.g., up to 1 second) may be used for collision-free channel access. In some cases, the present techniques may be used with enhanced mobile broadband (eMBB) systems, or ultra-reliable low-latency communication (URLLC) systems, or both. In some cases, one or more transmissions of the present techniques may be transmitted over an unlicensed band. In some cases, (e.g., based on a forward link DRX configuration), a sidelink peripheral UE may safely shut down its modem from monitoring SCI from a sidelink hub UE. In some cases, the arrival of a packet triggers the peripheral UE to sense the channel (e.g., including re-synchronization) and then to send data over the secured sub-channel. However, in some cases the sensing may consume a relatively large amount of time and/or power.

In some examples, a sidelink hub UE may transmit (e.g., groupcast) a SCI to specify a non-orthogonal resource pool for random access of both data and control transmissions from sidelink peripheral UEs. In some cases, resources in the triggered pool may be occupied/reserved by the sidelink hub UE. In some cases, the present techniques enable a sidelink peripheral UE to perform a relatively simple random-access protocol for channel access instead of the more complicated sensing procedure specified in mode 2. In some cases, based on a selected granularity of sub-channels, triggered random access channels may be efficiently used to directly carry reverse link data packets instead of just status report (SR) or buffer status report (BSR). In some cases, a sidelink peripheral UE may fall back to a low-power mode after sending all reverse link packets over the random access channel. In some cases, SR/BSR may be piggybacked with the transmitted data to request for additional scheduled transmit opportunities from the sidelink hub UE. In some cases, the configured SCI (e.g., random access channel SCI) from the sidelink hub UE may define other granularities (e.g., other than sub-channel x slot for the transmit resource pool) for a more flexible and more efficient use of radio resources.

In some examples, instead of monitoring for sidelink control information a sidelink peripheral UE may be configured to search for (e.g., configured to wake up to search for) a media access control-control element (MAC-CE), or downlink control information (DCI), or upper layer control packet that includes random access information (e.g., random access process, random access channel SCI, trigger RACH, etc.). In some examples, a sidelink peripheral UEs may be configured by a sidelink hub UE to monitor a group-common sub-channel (e.g., physical sidelink shared channel) that carries the MAC-CE, DCI, or upper layer control packet for all sidelink peripheral UEs.

The present techniques provide multiple benefits and improvements to sidelink communications. The present techniques provide power savings in the reverse link (e.g., in handling low effective duty cycle traffic). The present techniques enable a re-entry sidelink peripheral UE to use an updated contention window to access a specified sub-channel among multiple sub-channels. The present techniques provide a first-come first serve access over multiple pools that improve access due to random traffics from multiple peripheral UEs (e.g., during peak time). The present techniques enable feedback with respect to a first pool to be leveraged for improved overall performance in access and reverse link communications for sidelink. The present techniques enable two set of configurations for two respective pools to be carried by one SCI to save overhead (e.g., at least on cyclic redundancy check (CRC) bits). The present techniques reduce collisions and the impact of collided channel use (e.g., based on adding custom bits or scrambling bits in SCI, etc.).

Aspects of the disclosure are initially described in the context of wireless communications systems. Aspects of the disclosure are further illustrated by and described with reference to sidelink communication environments. Aspects of the disclosure are further illustrated by and described with reference to apparatus diagrams, system diagrams, and flowcharts that relate to reverse link communications for sidelink.

FIG. 1 illustrates an example of a wireless communications system 100 that supports resource pool-based communications for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a first UE (e.g., a first UE 115 of FIG. 1) may receive, from a second UE (e.g., a second UE 115 of FIG. 1), a configuration for receipt of a reverse sidelink resource pool message. In some cases, the second UE may identify a resource pool that includes sub-channels for reverse sidelink communications to the second UE, configure the reverse sidelink resource pool message that indicates the resource pool, and transmit the reverse sidelink resource pool message to the first UE. In some cases, the second UE may transmit the reverse sidelink resource pool message to the first UE via groupcast. In some cases, the first UE may determine that the first UE has information to be transmitted to the second UE via reverse sidelink communications. In some cases, the first UE may receive, in accordance with the configuration, the reverse sidelink resource pool message. In some cases, the first UE may identify, based on the reverse sidelink resource pool message, a resource pool that includes sub-channels for reverse sidelink communications to the second UE. In some cases, the first UE may attempt to access a sub-channel of the resource pool in order to transmit the information to the second UE via reverse sidelink communications. In some cases, the first UE may access the sub-channel of the resource pool and transmits the information to the second UE via the reverse sidelink communications.

Figure 2:
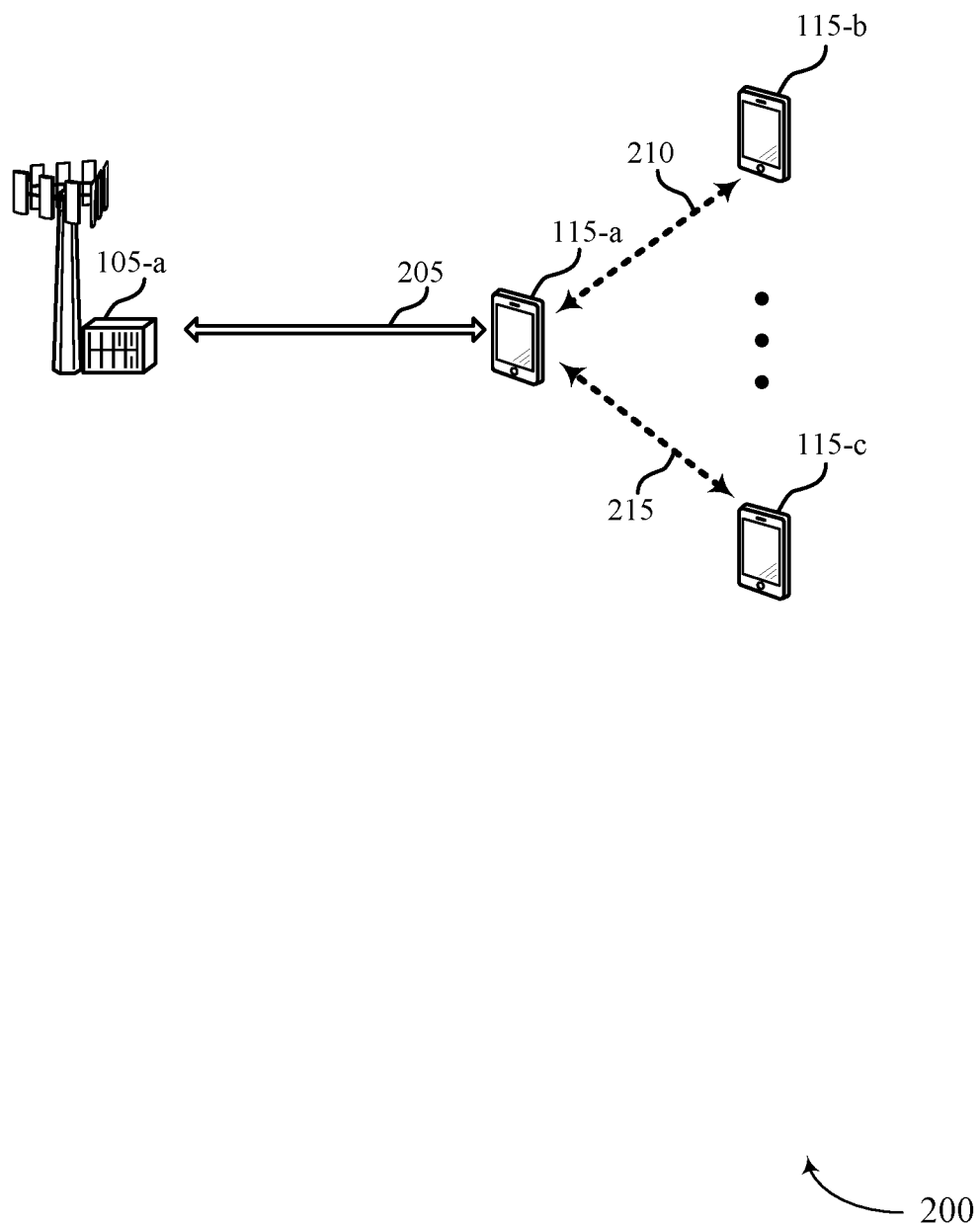
FIG. 2 illustrates an example of a wireless communications system that supports resource pool-based communications for sidelink in accordance with aspects of the present disclosure.

FIG. 2 illustrates an example of a wireless communications system 200 that supports resource pool-based communications for sidelink in accordance with aspects of the present disclosure. In some examples, wireless communications system 200 may implement aspects of wireless communication system 100.

As illustrated, wireless communications system 200 may include UE 115-a (e.g., sidelink hub UE), UE 115-b (e.g., a first sidelink peripheral UE), UE 115-c (e.g., a second sidelink peripheral UE), and base station 105-a, any of which may be an example of a UE 115 or a base station 105, respectively, as described herein with reference to FIG. 1. Wireless communications system 200 may include a link 205 between base station 105-a and UE 115-a. Wireless communications system 200 may also include a sidelink 210 between UE 115-a and UE 115-b and a sidelink 215 between UE 115-a and UE 115-c. In some examples, link 205 may include a downlink (e.g., forward link) and an uplink (e.g., reverse link). In some examples, base station 105-*a* may use the downlink of link 205 to convey control information or data, or both, to UE 115-*a*. And UE 115-*a* may use the uplink of link 205 to convey control information or data, or both, to base station 105-*a*. In some cases, the downlink of link 205 may use different time resources or different frequency resources, or different time resources and different frequency resources than the uplink of link 205.

In some examples, wireless communications system 200 may include a star-topology network. In some examples, wireless communications system 200 may include multiple sidelink hub UEs (e.g., UE 115-*a*) where each of the multiple sidelink hub UEs include sidelink connections to one or more sidelink peripheral UEs (e.g., UE 115-*b*, UE 115-*c*). In some cases, one or more sidelink peripheral UEs may attempt to access resources from a resource pool provided by a respective sidelink hub UE (e.g., UE 115-*a*). In some cases, UE 115-*b* (e.g., the first sidelink peripheral UE) and UE 115-*c* (e.g., the second sidelink peripheral UE) may have data to transmit to UE 115-*a* (sidelink hub UE).

In some examples, UE 115-*a* (sidelink hub UE) may generate a configuration for receipt of a reverse sidelink resource pool message. In some cases, UE 115-*b* (sidelink peripheral UE) may receive, from UE 115-*a*, the generated configuration. In some cases, UE 115-*b* may determine that it has information to be transmitted to UE 115-*a* via reverse sidelink communications (e.g., via reverse link over sidelink 210).

In some examples, UE 115-*a* may identify a resource pool that includes sub-channels for reverse sidelink communications to UE 115-*a*. In some cases, UE 115-*a* may configure a reverse sidelink resource pool message that indicates the resource pool. In some cases, UE 115-*a* may transmit (e.g., via groupcast) the reverse sidelink resource pool message to UE 115-*b*. In some examples, UE 115-*a* may transmit the reverse sidelink resource pool message via at least one of first stage sidelink control information, second stage sidelink control information, a media access control element, or downlink control information. In some cases, UE 115-*a* may transmit to UE 115-*b* (e.g., at least to UE 115-*b*) a first stage sidelink control information compatible with legacy UEs (e.g., UE 115-*b*, or UE 115-*c*, or one or more other peripheral UEs, or any combination thereof) and a second stage sidelink control information that is indicative of a random access process for accessing the sub-channel of the resource pool. In some cases, UE 115-*a* may transmit a first stage sidelink control information that either includes one or more bits or that is scrambled with bits that are indicative of a random access process for accessing the sub-channel of the resource pool.

In some examples, UE 115-*b* may receive, in accordance with the configuration, the reverse sidelink resource pool message from UE 115-*a*. In some cases, UE 115-*b* may identify, based at least in part on the reverse sidelink resource pool message, a resource pool that includes sub-channels for reverse sidelink communications to UE 115-*a*. In some cases, UE 115-*b* may attempt to access a sub-channel of the resource pool in order to transmit the information to UE 115-*a* via reverse sidelink communications (e.g., via reverse link over sidelink 210).

In some examples, when attempting to access the sub-channel of the resource pool UE 115-*b* may perform the random access process indicated by the sidelink control information from UE 115-*a*. In some cases, UE 115-*b* may access the sub-channel of the resource pool based on performing the random access process indicated by the sidelink control information from UE 115-*a*. In some cases, UE 115-*b* may transmit the information to UE 115-*a* via the reverse sidelink communications (e.g., via reverse link over sidelink 210) based on accessing the sub-channel of the resource pool.

In some examples, UE 115-*b* may receive the reverse sidelink resource pool message via at least one of first stage sidelink control information, second stage sidelink control information, a media access control-control element (MAC-CE), or downlink control information (DCI). In some examples, UE 115-*b* may receive the first stage sidelink control information within a portion (e.g., only a portion) of a receiving sub-channel or with a coding rate or a transmission power that is below a threshold, or any combination thereof.

Figure 3:
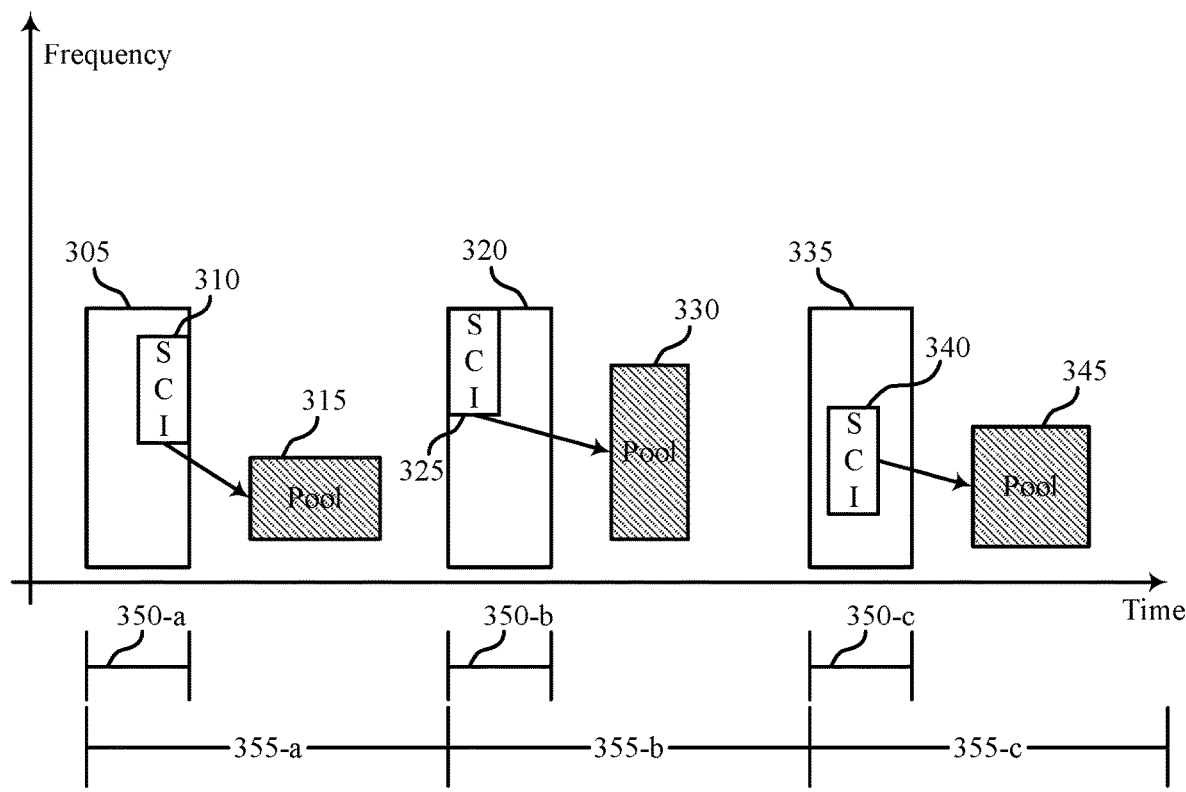
FIG. 3 illustrates an example of an environment that supports resource pool-based communications for sidelink in accordance with aspects of the present disclosure.

FIG. 3 illustrates an example of an environment 300 that supports resource pool-based communications for sidelink in accordance with aspects of the present disclosure. In some examples, environment 300 may implement aspects of wireless communication system 100.

As illustrated, environment 300 may include periodic window 305, periodic window 320, and periodic window 335. In some cases, periodic window 305 may be of length 350-*a*, periodic window 320 may be of length 350-*b*, and periodic window 335 may be of length 350-*c*. In some cases, length 350-*a*, length 350-*b*, and length 350-*c* may each span a predetermined period of time (e.g., each span T3 seconds). In some cases, a sidelink hub UE (e.g., UE 115-*a*) may configure a periodic window (e.g., periodic window 305, periodic window 320, and periodic window 335) to occur at a predetermined periodicity. As shown, periodic window 305, periodic window 320, and periodic window 335 may occur at the illustrated periodicity (e.g., time period 355-*a*, time period 355-*b*, time period 355-*c*). As shown, time period 355-*a*, time period 355-*b*, time period 355-*c* may each span a predetermined period of time (e.g., each spans T4 seconds). Accordingly, the periodic window (e.g., periodic window 305, periodic window 320, and periodic window 335) may occur at a periodicity of every T4 seconds.

As illustrated, environment 300 may include resource pool 315, resource pool 330, and resource pool 345. In some cases, resource pool 315, or resource pool 330, or resource pool 345, or any combination thereof, may include non-orthogonal resources. In some cases, resource pool 315 may include time resources (e.g., resource elements, resource blocks, OFDM symbols, slots, subframes, frames, etc.) that span at least a portion of time period 355-*a*, resource pool 330 may include time resources that span at least a portion of time period 355-*b*, and resource pool 345 may include time resources that span at least a portion of time period 355-*c*. In some cases, a time span of resource pool 315 may differ from a time span of resource pool 330 or resource pool 345, or both, and a time span of resource pool 345 may differ from a time span of resource pool 315 or resource pool 330, or both.

In some cases, resource pool 315 may include frequency resources (e.g., resource elements, resource blocks, OFDM subcarriers, physical resource blocks) that span at least a portion of a frequency bandwidth (e.g., sub-channels for reverse sidelink communications), resource pool 330 may include frequency resources that span at least a portion of a frequency bandwidth (e.g., sub-channels for reverse sidelink communications), and resource pool 345 may include frequency resources that span at least a portion of a frequency bandwidth (e.g., sub-channels for reverse sidelink communications). In some cases, a frequency bandwidth of resource pool 315 may differ from a frequency bandwidth of resource pool 330 or resource pool 345, or both, and a frequency bandwidth of resource pool 345 may differ from a frequency bandwidth of resource pool 315 or resource pool 330, or both.

In some cases, the sidelink hub UE may transmit to one or more sidelink peripheral UEs (e.g., UE 115-*b*, UE 115-*c*, etc.) a configuration message that indicates at least the length of the periodic window (e.g., periodic window has a length of length 350-*a*, or length 350-*b*, or length 350-*c*, etc.) and periodicity of the periodic window (e.g., periodic window has a periodicity of time period 355-*a*, or time period 355-*b*, or time period 355-*c*, etc.). In some cases, a sidelink peripheral UE may receive, in accordance with the configuration, the first sidelink control information 310 (e.g., reverse sidelink resource pool message). In some cases, the sidelink peripheral UE may identify, based on the first sidelink control information 310, resource pool 315 that includes sub-channels for reverse sidelink communications to a sidelink hub UE. In some cases, the sidelink peripheral UE may attempt to access a sub-channel of the resource pool 315 in order to transmit information to the sidelink hub UE via reverse sidelink communications.

As shown, a first sidelink control information 310 may be transmitted by a sidelink hub UE during periodic window 305. In some cases, first sidelink control information 310 may include, may be transmitted in, or may be a reverse sidelink resource pool message. In the illustrated example, a second sidelink control information 325 may be transmitted by the sidelink hub UE during periodic window 320, and a third sidelink control information 340 may be transmitted by the sidelink hub UE during periodic window 335. In some cases, a format of first sidelink control information 310, or second sidelink control information 325, or third sidelink control information 340, or any combination thereof, may be configured by the sidelink hub UE.

In some cases, first sidelink control information 310, or second sidelink control information 325, or third sidelink control information 340, or any combination thereof, may include a random access control channel (RACH) sidelink control information configured to indicate a random access procedure that a peripheral sidelink UE may perform to access resources (e.g., resource pool 315, resource pool 330, resource pool 345, etc.).

As shown, first sidelink control information 310 may indicate resource pool 315, second sidelink control information 325 may indicate resource pool 330, and third sidelink control information 340 may indicate resource pool 345. In some cases, a sidelink peripheral UE may be configured (e.g., via the configuration message) with periodic windows (e.g., periodic window 305, periodic window 320, and periodic window 335) in which to search for RACH sidelink control information (first sidelink control information 310, second sidelink control information 325, third sidelink control information 340, etc.) from a sidelink hub UE to enable the sidelink peripheral UE to transmit pending data or information (e.g., one or more reverse link packets), while avoiding using a time-consuming and power-consuming sensing procedure used by some sidelink systems.

In some cases, first sidelink control information 310, or second sidelink control information 325, or third sidelink control information 340, or any combination thereof, may specify a non-orthogonal resource pool (e.g., resource pool 315, resource pool 330, resource pool 345, etc.) that a sidelink peripheral UE may attempt to access with a random-access procedure specified by sidelink control information (e.g., first sidelink control information 310, second sidelink control information 325, third sidelink control information 340, etc.). In some cases, the sidelink peripheral UE may access a sub-channel of a resource pool (e.g., resource pool 315, resource pool 330, resource pool 345, etc.) via the random-access procedure and transmit pending data or information to a sidelink hub UE via reverse sidelink communications (e.g., triggered random access channel). In some cases, the sidelink peripheral UE may transmit data or control information, or both, over the reverse sidelink communications.

In some examples, sidelink control information (e.g., first sidelink control information 310, second sidelink control information 325, third sidelink control information 340, etc.) may include a stage one sidelink control information (e.g., SCI-1, first sidelink control information 310, second sidelink control information 325, third sidelink control information 340, etc.) and a stage two sidelink control information (e.g., SCI-2, first sidelink control information 310, second sidelink control information 325, third sidelink control information 340, etc.). In some cases, stage one sidelink control information may be backwards compatible with a legacy UE device. In some cases, the sidelink control information (e.g., stage two sidelink control information) may carry information related to a random access channel (e.g., the random-access procedure to access a resource pool, etc.). In some cases, a stage two sidelink control information (e.g., SCI-2) may carry random access channel information when physical sidelink shared channel data is transmitted over a sub-channel that a peripheral UE accesses based on the stage two sidelink control information (e.g., the random-access procedure).

In some examples, sidelink control information (e.g., first sidelink control information 310, second sidelink control information 325, third sidelink control information 340, etc.) may include a stage one sidelink control information configured with custom bits (e.g., one or more bits, or one or more scrambled bits, or both, configured to indicate the random access channel information). In some cases, a stage one sidelink control information configured with one or more custom bits may be used for sidelink communications over an unlicensed band (e.g., without legacy UE devices). In some cases, a stage one sidelink control information configured with one or more custom bits may be used for light-weight SCI (e.g., SCI-only) transmission (e.g., to configure reverse sidelink communications with partial occupancy of a sub-channel, or configure reverse sidelink communications with a relatively low coding rate, or configure reverse sidelink communications with relatively low transmission power, or any combination thereof). In some cases, the present techniques may enable a sidelink peripheral UE to occupy a sub-channel without the sidelink peripheral UE having to perform channel sensing (e.g., to transmit a light-weight SCI-only transmission, etc.).

In some examples, sidelink control information (e.g., first sidelink control information 310, second sidelink control information 325, third sidelink control information 340, etc.) may define a local sub-channel (e.g., local/triggered sub-channel) for a triggered resource pool (e.g., resource pool 315, resource pool 330, resource pool 345, etc.). In some cases, the local sub-channel may have a different granularity of the resource pool than that of a sub-channel defined in other sidelink system (e.g., other sidelink resource pools). In some cases, the local sub-channel may include a locally-defined granularity of a resource pool, where the locally-defined granularity includes a time domain granularity or a frequency domain granularity of sub-channels in the resource pool that differs from a network-defined granularity (e.g., granularity defined by a base station, etc.). In some examples, sidelink control information (e.g., first sidelink control information 310, second sidelink control information 325, third sidelink control information 340, etc.) may announce a multiple-channel ALOHA-based random access pool for sidelink peripheral UEs.

Figure 4:
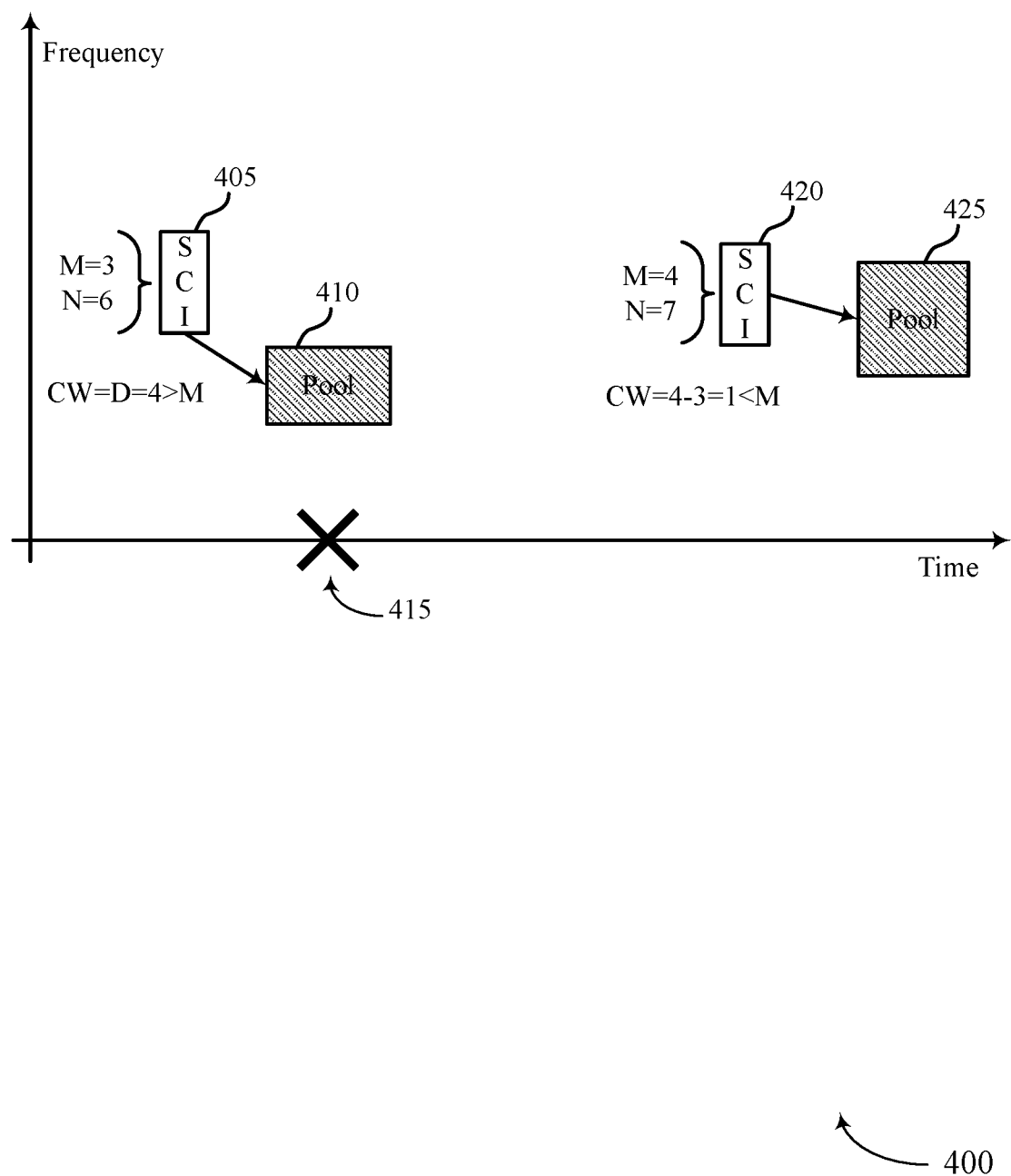
FIG. 4 illustrates an example of an environment that supports resource pool-based communications for sidelink in accordance with aspects of the present disclosure.

FIG. 4 illustrates an example of an environment 400 that supports resource pool-based communications for sidelink in accordance with aspects of the present disclosure. In some examples, environment 400 may implement aspects of wireless communication system 100.

As illustrated, environment 400 may include sidelink control information 405 and sidelink control information 420. As shown, sidelink control information 405 may indicate resource pool 410, and sidelink control information 420 may indicate resource pool 425.

In some cases, a sidelink hub UE may configure a resource pool (e.g., resource pool 410, resource pool 425, etc.) to include M sub-channels (or local sub-channels), which may be announced by the sidelink control information (e.g., sidelink control information 405, sidelink control information 420, etc.), where M is a positive integer greater than 1. In some cases, a sidelink peripheral UE may select a random number between 1 and M to occupy the sub-channel or local sub-channel (e.g., determine whether the sidelink peripheral UE may occupy the sub-channel or local sub-channel) corresponding to its randomly selected number.

In some examples, a sidelink control information (e.g., sidelink control information 405, sidelink control information 420) may specify an integer number N that is larger than M to provide a contention window configuration, to spread random access channels beyond a single pool. In some cases, when a sidelink peripheral UE has data to send to a sidelink hub UE over a reverse link, the sidelink peripheral UE may select a random number D that is uniformly distributed between 1 and N as its contention window. When D is less than or equal to M (e.g., D≤M), the sidelink peripheral UE may transmit over the D-th sub-channel in resource pool 410. Otherwise, the sidelink peripheral UE may subtract M from D (e.g., D−M) as its updated contention window for access in a subsequent or next sidelink control information triggered resource pool (e.g., resource pool 425 triggered by sidelink control information 420).

In the illustrated example, the sidelink peripheral UE may have a reverse link packet arrive before sidelink control information 405. The sidelink peripheral UE may identify sidelink control information 405, identify information from sidelink control information 405 (e.g., random access process, etc.), and determine aspects of resource pool 410 based on information from sidelink control information 405. In some cases, the sidelink peripheral UE may identify sidelink control information 405 based on the arrival of the reverse link packet. In the illustrated example, the sidelink peripheral UE may randomly select D=4 for its contention window when sidelink control information 405 indicates M=3 and N=6. If M had been less than or equal to M, then the sidelink peripheral UE may have transmitted pending data (e.g., the reverse link packet) to the sidelink hub UE over the D-th sub-channel in resource pool 410. However, since the sidelink peripheral UE randomly selected a value for D that is greater than M (D=4 when M=3) for its contention window, then access to resource pool 410 is denied at 415.

However, the sidelink peripheral UE may access a sub-channel of a subsequent resource pool (e.g., resource pool 425) based on the present techniques. In some examples, the sidelink peripheral UE subtracts M from D (e.g., CW=D−M=4−=1) as its updated contention window for access in the next resource pool (e.g., resource pool 425). In the illustrated example, sidelink control information 420 may indicate M=4 and N=7. But since the sidelink peripheral UE calculated an updated contention window (CW=1) based on subtracting M from D (D=4), then the sidelink peripheral UE may transmit pending data (e.g., the reverse link packet) to the sidelink hub UE over the first sub-channel (e.g., first sub-channel for CW=1) in resource pool 425.

The present techniques provide several benefits and improvements to existing sidelink communication systems. In some examples, the present techniques enable a re-entry sidelink peripheral UE (e.g., a sidelink peripheral UE that has already drawn at least one random number D) to use an updated contention window to access a sub-channel among M sub-channels (e.g., of a next resource pool) when the updated contention window is not larger than M. The present techniques provide a first-come first serve protocol for multiple resource pools that improve resource accessibility during peak times due to random traffics from multiple peripheral UEs.

Figure 5:
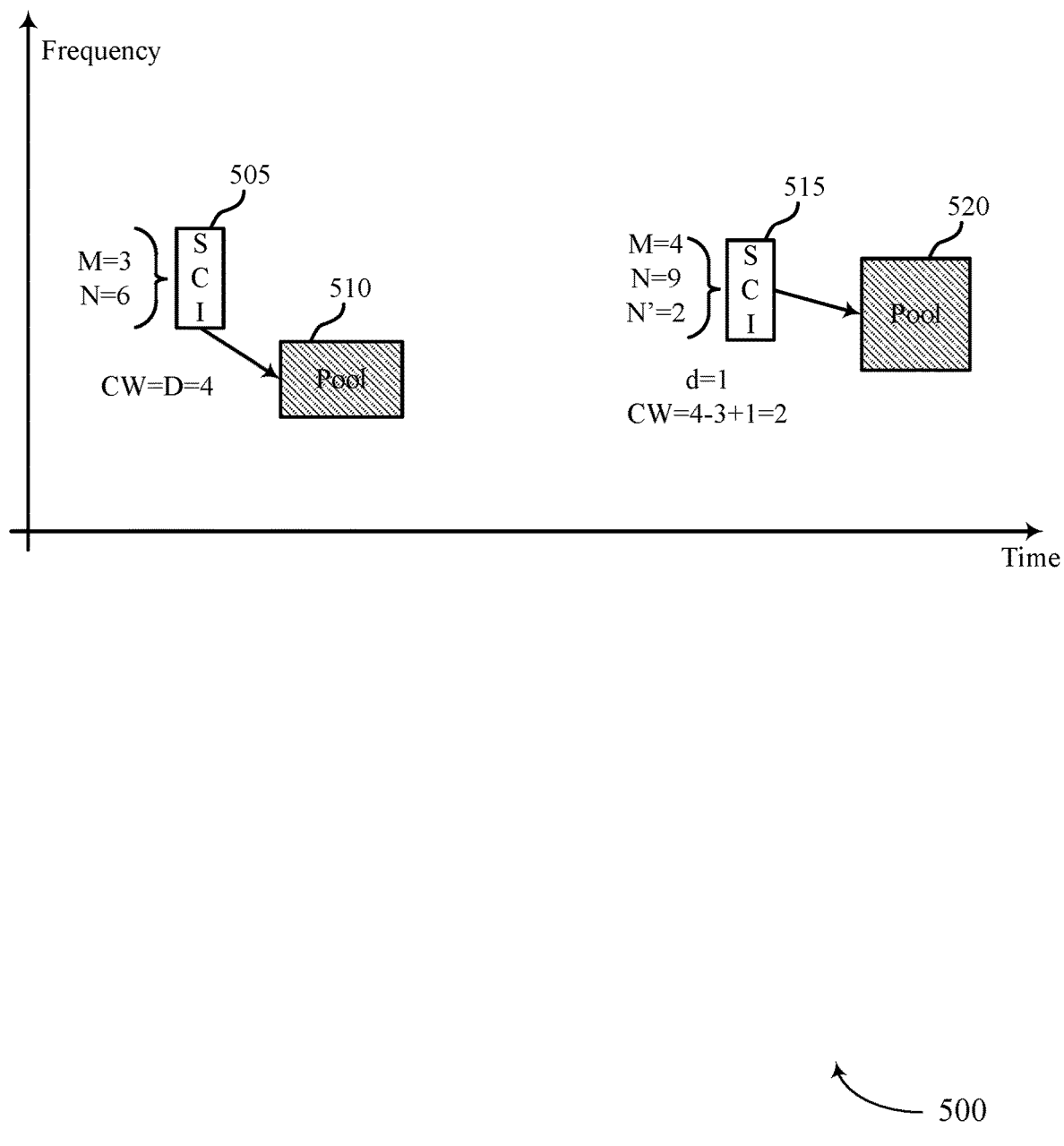
FIG. 5 illustrates an example of an environment that supports resource pool-based communications for sidelink in accordance with aspects of the present disclosure.

FIG. 5 illustrates an example of an environment 500 that supports resource pool-based communications for sidelink in accordance with aspects of the present disclosure. In some examples, environment 500 may implement aspects of wireless communication system 100.

As illustrated, environment 500 may include sidelink control information 505 and sidelink control information 515. As shown, sidelink control information 505 may indicate resource pool 510, and sidelink control information 515 may indicate resource pool 520.

In some examples, when a sidelink hub UE observes or predicts a congestion over a triggered random access channel, the sidelink hub UE may specify a larger N for new coming sidelink peripheral UEs (e.g., a sidelink peripheral UE that has not yet drawn at least one random number D) and a non-zero N' for re-entry sidelink peripheral UEs (e.g., a sidelink peripheral UE that has already drawn at least one random number D). In some examples, a re-entry sidelink peripheral UE may draw another random number d, uniformly distributed between 1 and N', and may add d to its current contention window.

In the illustrated example, a sidelink hub UE may configure sidelink control information 505 to indicate M=3 and N=6 for resource pool 510. In the illustrated example, for resource pool 510 a sidelink peripheral UE may select D=4 for its contention window. However, the sidelink hub UE may observe or predict a congestion in relation to a random access procedure associated with resource pool 510. Accordingly, for sidelink control information 515 the sidelink hub UE may specify a larger N for new coming sidelink peripheral UEs (e.g., a sidelink peripheral UE that has not yet drawn at least one random number D) and a non-zero N' for re-entry sidelink peripheral UEs. In the illustrated example, the sidelink hub UE may configure sidelink control information 515 to indicate M=4, N=9, and N'=2. Accordingly, the sidelink peripheral UE update its contention window for resource pool 520 by subtracting M=3 from D=4 (CW=4−3), but since the sidelink peripheral UE has already drawn at least one random number D, the sidelink peripheral UE may randomly select d=1 and update its contention window for resource pool 520 by subtracting M=3 from D=4 and adding d=1 (e.g., CW=D−M+d=4−3+1=2) as its updated contention window for access in the next resource pool (e.g., resource pool 520). Since the updated contention window is less than M for the next resource pool (e.g., 2<M=4), the sidelink peripheral UE may access the $2^{nd}$ sub-channel (CW=2) among the M sub-channels of the next resource pool.

Figure 6:
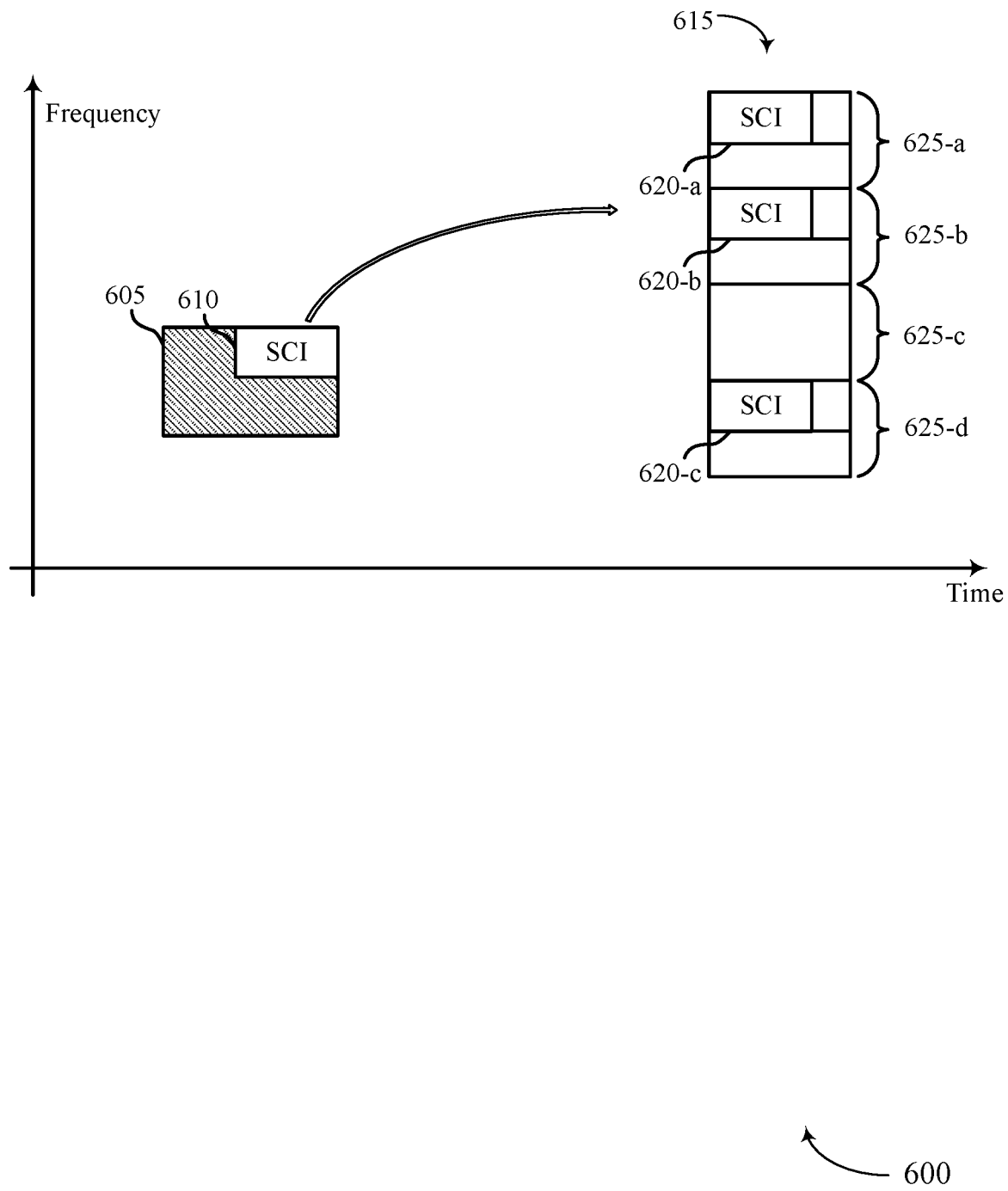
FIG. 6 illustrates an example of an environment that supports resource pool-based communications for sidelink in accordance with aspects of the present disclosure.

FIG. 6 illustrates an example of an environment 600 that supports resource pool-based communications for sidelink in accordance with aspects of the present disclosure. In some examples, environment 600 may implement aspects of wireless communication system 100.

As illustrated, environment 600 may include a resource pool 605, sidelink control information 610, and reserved physical sidelink shared channel 615. As shown, reserved physical sidelink shared channel 615 may include sidelink control information 620-a in sub-channel 625-a, sidelink control information 620-b in sub-channel 625-b, sub-channel 625-c, and sidelink control information 620-c in sub-channel 625-d.

In some examples, a sidelink hub UE may use sidelink control information to specify a triggered RACH resource pool in a reserved physical sidelink shared channel (e.g., to accommodate a processing delay, etc.). In some cases, up to two reservations may be used for blind retransmission (e.g., of the same transport block). In the illustrated example, a sidelink hub UE may make a reservation in a first sidelink control information (e.g., sidelink control information 610) for a subsequent RACH access that includes a larger number of available sub-channels in reserved physical sidelink shared channel 615.

As shown, resource pool 605 may carry sidelink control information 610 (e.g., a SCI-only transmission) that occupies a smaller number of sub-channels than sidelink control information 610 reserves in the reserved physical sidelink shared channel 615. In some examples, a sidelink peripheral UE may occupy a respective sub-channel by transmitting sidelink control information and a physical sidelink shared channel.

Figure 7:
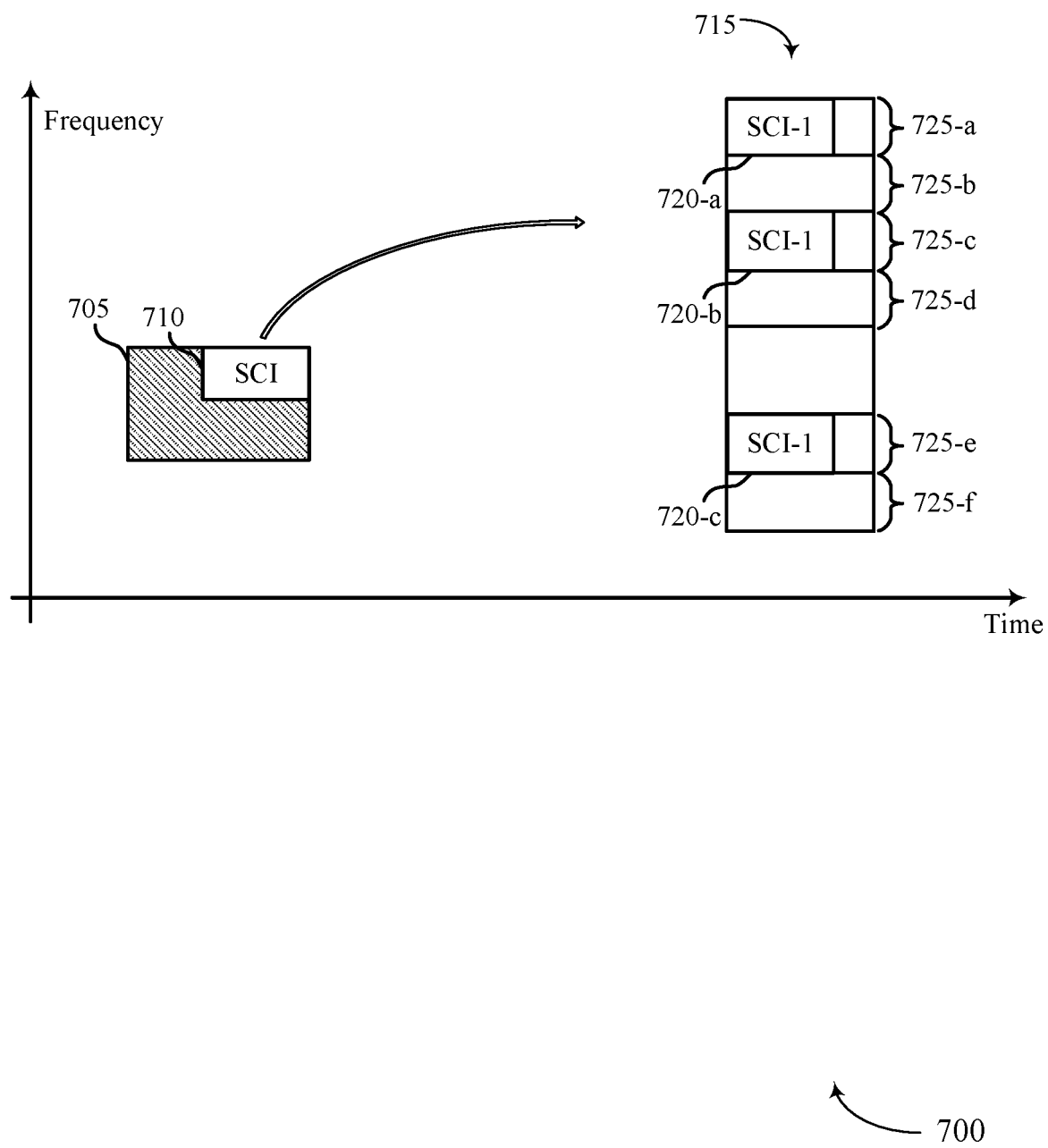
FIG. 7 illustrates an example of an environment that supports resource pool-based communications for sidelink in accordance with aspects of the present disclosure.

FIG. 7 illustrates an example of an environment 700 that supports resource pool-based communications (e.g., reverse link communications) for sidelink in accordance with aspects of the present disclosure. In some examples, environment 700 may implement aspects of wireless communication system 100.

As illustrated, environment 700 may include a resource pool 705, sidelink control information 710, and reserved physical sidelink shared channel 715. As shown, reserved physical sidelink shared channel 715 may include sidelink control information 720-a in sub-channel 725-a, sub-channel 725-b, sidelink control information 720-b in sub-channel 725-c, sub-channel 725-d, sidelink control information 720-c in sub-channel 725-e, and sub-channel 725-f.

In the illustrated example, a sidelink hub UE may make a reservation in sidelink control information 710 for a subsequent RACH access that includes a larger number of available sub-channels (e.g., local sub-channels, triggered local sub-channels) in reserved physical sidelink shared channel 715. In some examples, sidelink peripheral UEs may occupy respective local sub-channels. In some examples, sidelink peripheral UEs may transmit a system frame number stage one sidelink control information to occupy a sub-channel where a local sub-channel is located. In some cases, a sub-channel may include an integer number of local/triggered sub-channels.

In some examples, a sidelink peripheral UE may receive an indication in sidelink control information 710 of a second resource pool that includes local sub-channels (e.g., sub-channels 725) that are available for access subsequent to an availability of sub-channels of a previous resource pool (e.g., resource pool 705). In some cases, sidelink control information 710 may include a system frame number. In some cases, the local sub-channels 725 may occupy sub-channels of physical sidelink shared channel 715 reserved by the sidelink hub UE via sidelink control information 710.

Figure 8:
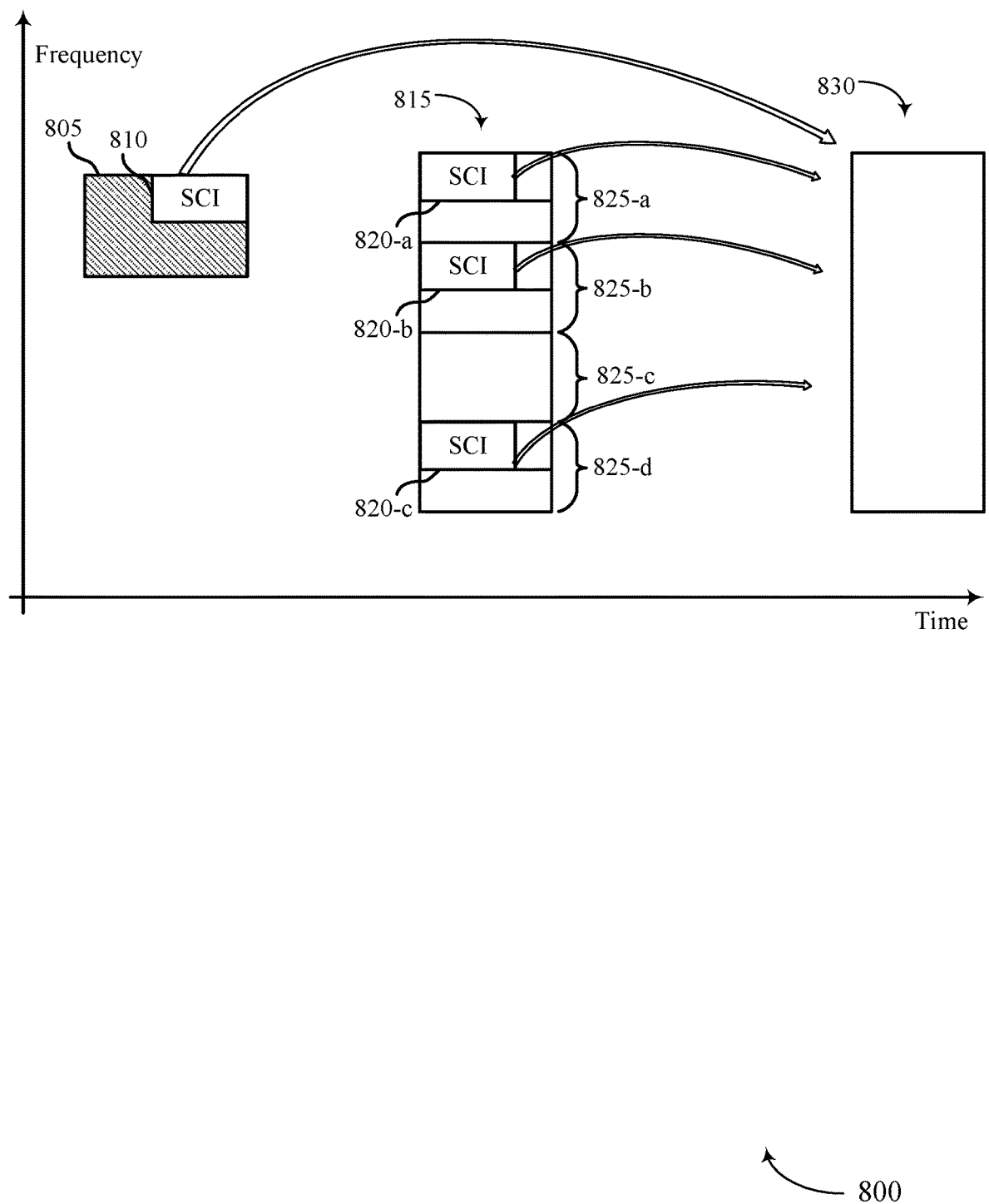
FIG. 8 illustrates an example of an environment that supports resource pool-based communications for sidelink in accordance with aspects of the present disclosure.

FIG. 8 illustrates an example of an environment 800 that supports resource pool-based communications (e.g., reverse link communications) for sidelink in accordance with aspects of the present disclosure. In some examples, environment 800 may implement aspects of wireless communication system 100.

As illustrated, environment 800 may include a resource pool 805, sidelink control information 810, and first reserved physical sidelink shared channel 815, and second reserved physical sidelink shared channel 830. As shown, first reserved physical sidelink shared channel 815 may include sidelink control information 820-a in sub-channel 825-a, sidelink control information 820-b in sub-channel 825-b, sub-channel 825-c, and sidelink control information 820-c in sub-channel 825-d.

When a sidelink hub UE has two reserved physical sidelink shared channel (e.g., first reserved physical sidelink shared channel 815 and second reserved physical sidelink shared channel 830), the sidelink hub UE may configure one RACH resource pool occupying the two physical sidelink shared channel reservations, or two RACH resource pools located at the respective physical sidelink shared channels.

To guarantee the reservation of the second reserved physical sidelink shared channel 830, the sidelink hub UE may arrange a double reservation via the first reserved physical sidelink shared channel 815. In some examples, a sidelink peripheral UE that determines to use the second reserved physical sidelink shared channel 830 for RACH may transmit a common sidelink control information (e.g., a system frame number stage one sidelink control information) to reserve the second reserved physical sidelink shared channel 830. In some examples, a sidelink peripheral UE that jumps in the first reserved physical sidelink shared channel 815 for RACH may include in its sidelink control information (e.g., SCI-1, sidelink control information 825-a, sidelink control information 825-b, sidelink control information 825-c, etc.) the reservation of the second reserved physical sidelink shared channel 830 (e.g., the second reserved physical sidelink shared channel 830 as a whole), whether or not sidelink peripheral UE transmits data on the second reserved physical sidelink shared channel 830.

In some examples, a resource pool occupies resources of the first reserved physical sidelink shared channel 815 reserved by the sidelink hub UE and resources of the second reserved physical sidelink shared channel 830 reserved by the sidelink hub UE. In some cases, sidelink communications (e.g., stage one sidelink control information, SCI-1, sidelink control information 810, sidelink control information 825-a, sidelink control information 825-b, sidelink control information 825-c, reverse sidelink communications, etc.) from a sidelink peripheral UE may indicate a first resource pool and a second resource pool. In some cases, the first resource pool may occupy resources of the first reserved physical sidelink shared channel 815 reserved by the sidelink hub UE and the second resource pool may occupy resources of the second reserved physical sidelink shared channel 830 reserved by the sidelink hub UE. In some examples, the sidelink communications comprises a reservation for the first reserved physical sidelink shared channel 815 and a reservation for the second reserved physical sidelink shared channel 830. In some cases, a sidelink communication from the sidelink peripheral UE may include a reservation for the second reserved physical sidelink shared channel 830.

The present techniques include several benefits and improvements. With two RACH resource pools feedback with respect to the first resource pool (e.g., of first reserved physical sidelink shared channel 815) may be leveraged for better overall performance. In some examples, two sets of configurations for the two respective resource pools (e.g., of first reserved physical sidelink shared channel 815 and second reserved physical sidelink shared channel 830) may be indicated by a single sidelink control information (e.g., sidelink control information 810) to save system overhead (e.g., at least on CRC bits).

Figure 9:
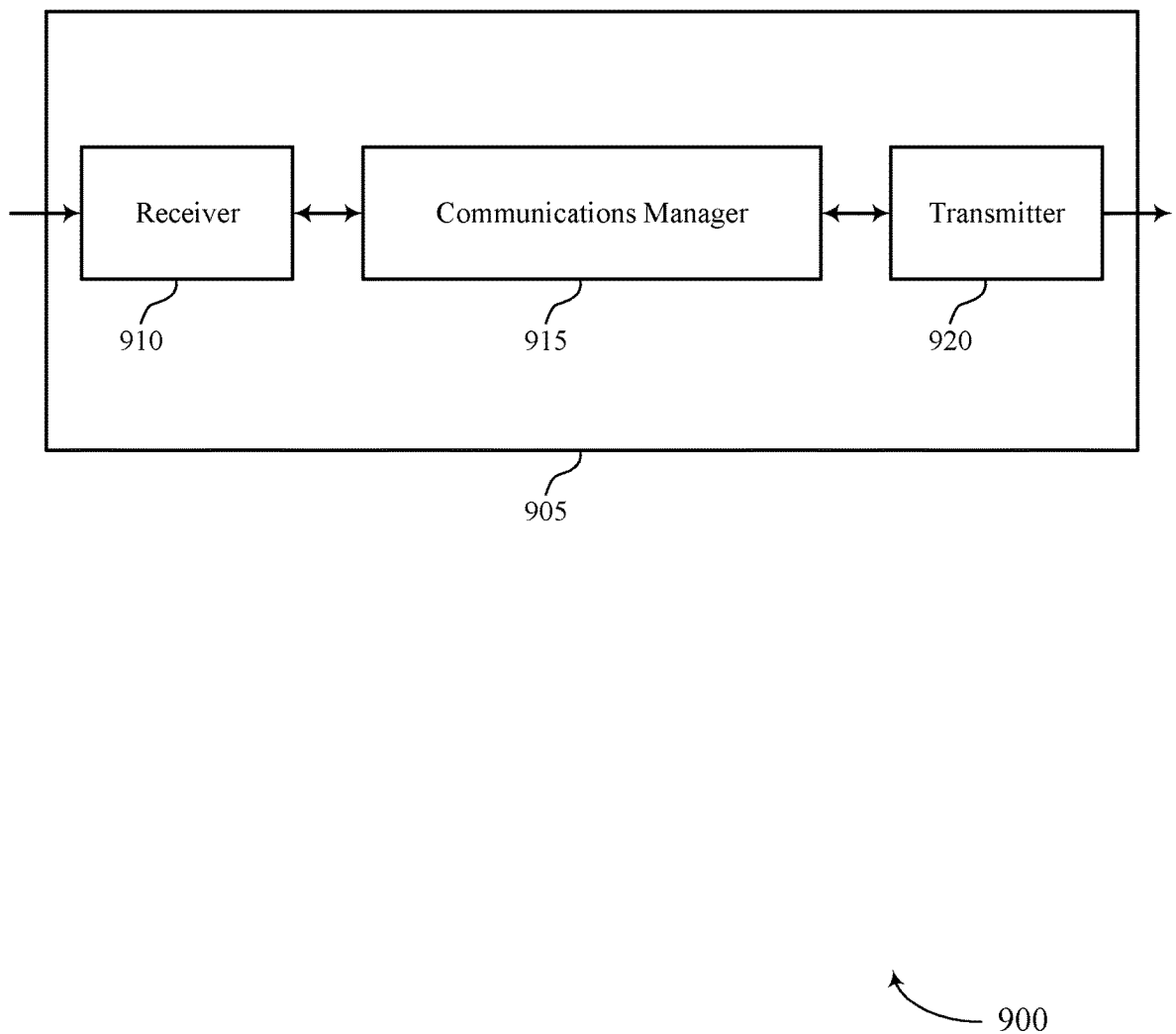
FIGS. 9 and 10 show block diagrams of devices that support resource pool-based communications for sidelink in accordance with aspects of the present disclosure.

FIG. 9 shows a block diagram 900 of a device 905 that supports resource pool-based communications (e.g., reverse link communications) for sidelink in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reverse link communications for sidelink, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a second UE, a configuration for receipt of a sidelink (e.g., reverse sidelink) resource pool message, determine that the first UE has information to be transmitted to the second UE via sidelink communications (e.g., reverse sidelink communications), receive, in accordance with the configuration, the sidelink resource pool message, identify, based on the sidelink resource pool message, a resource pool that includes sub-channels for sidelink communications to the second UE, and attempt to access a sub-channel of the resource pool in order to transmit the information to the second UE via sidelink communications. The communications manager 915 may also identify a resource pool that includes sub-channels for sidelink communications to the second UE, configure a sidelink resource pool message that indicates the resource pool, and transmit, via groupcast to the first UE, the sidelink resource pool message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
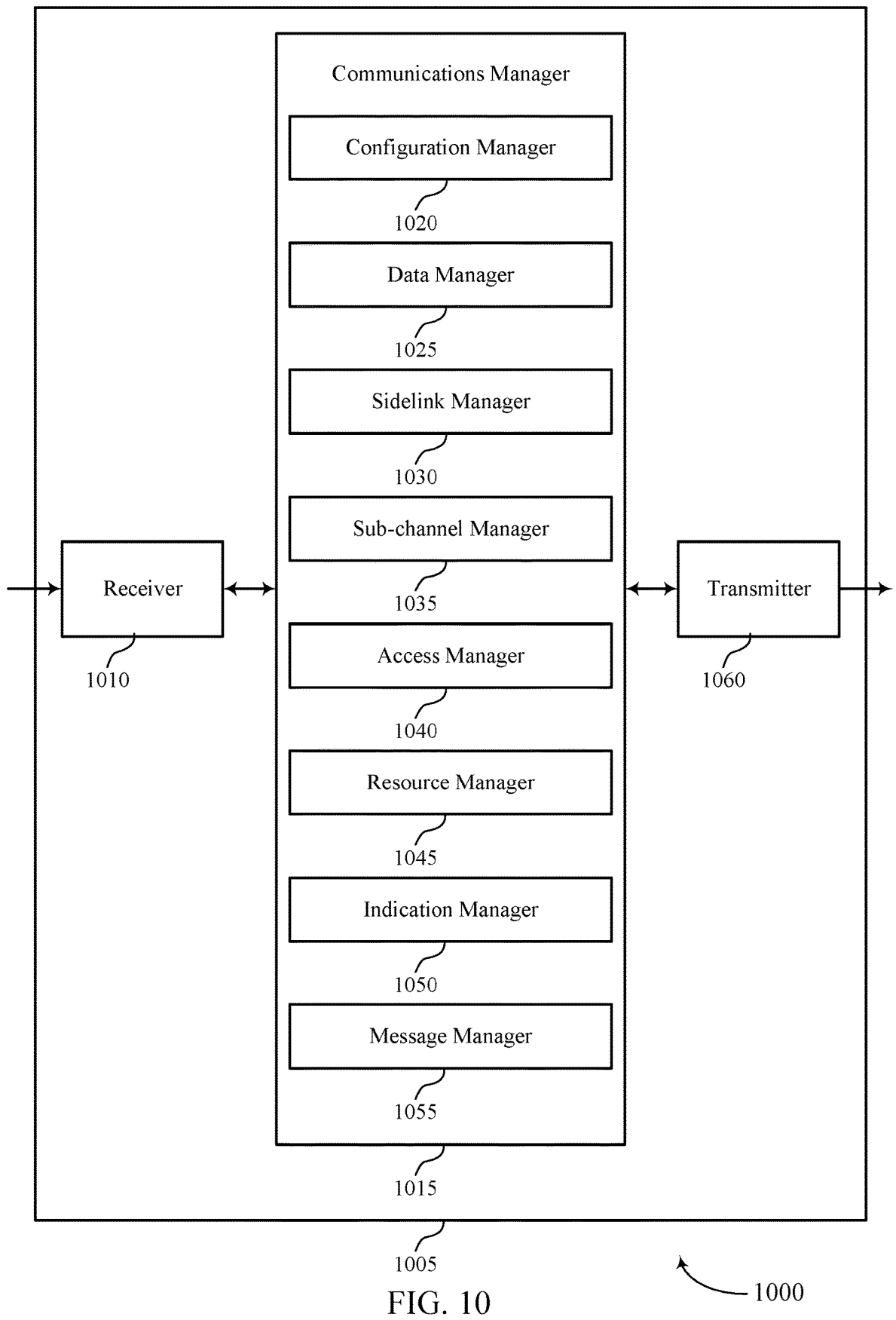

FIG. 10 shows a block diagram 1000 of a device 1005 that supports resource pool-based communications (e.g., reverse link communications) for sidelink in accordance with aspects of the present disclosure. The device 1005 may be an example of aspects of a device 905, or a UE 115 as described herein. The device 1005 may include a receiver 1010, a communications manager 1015, and a transmitter 1060. The device 1005 may also include a processor. Each of these components may be in communication with one another (e.g., via one or more buses).

The receiver 1010 may receive information such as packets, user data, or control information associated with various information channels (e.g., control channels, data channels, and information related to link communications (e.g., reverse sidelink communications) for sidelink, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a data manager 1025, a sidelink manager 1030, a sub-channel manager 1035, an access manager 1040, a resource manager 1045, an indication manager 1050, and a message manager 1055. The communications manager 1015 may be an example of aspects of the communications manager 1210 described herein.

The configuration manager 1020 may receive, from a second UE, a configuration for receipt of a sidelink (e.g., reverse sidelink) resource pool message.

The data manager 1025 may determine that the first UE has information to be transmitted to the second UE via sidelink communications.

The sidelink manager 1030 may receive, in accordance with the configuration, the sidelink resource pool message. The sub-channel manager 1035 may identify, based on the sidelink resource pool message, a resource pool that includes sub-channels for sidelink communications to the second UE. The access manager 1040 may attempt to access a sub-channel of the resource pool in order to transmit the information to the second UE via sidelink communications. The resource manager 1045 may identify a resource pool that includes sub-channels for sidelink communications to the second UE.

The indication manager 1050 may configure a sidelink resource pool message that indicates the resource pool. The message manager 1055 may transmit, via groupcast to the first UE, the sidelink resource pool message.

The transmitter 1060 may transmit signals generated by other components of the device 1005. In some examples, the transmitter 1060 may be collocated with a receiver 1010 in a transceiver module. For example, the transmitter 1060 may be an example of aspects of the transceiver 1220 described with reference to FIG. 12. The transmitter 1060 may utilize a single antenna or a set of antennas.

Figure 11:
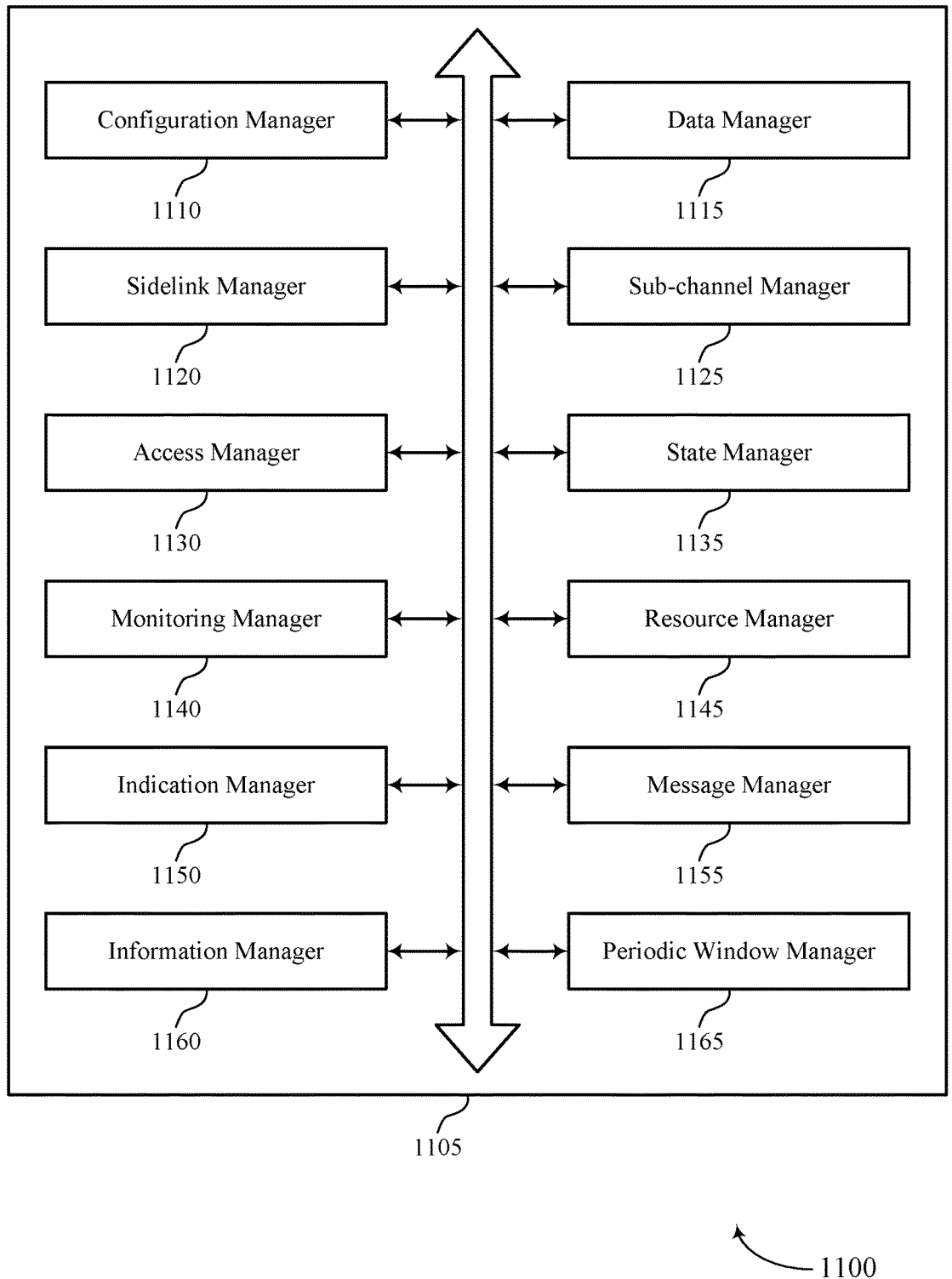
FIG. 11 shows a block diagram of a communications manager that supports resource pool-based communications for sidelink in accordance with aspects of the present disclosure.

FIG. 11 shows a block diagram 1100 of a communications manager 1105 that supports resource pool-based communications (e.g., reverse sidelink communications) for sidelink in accordance with aspects of the present disclosure. The communications manager 1105 may be an example of aspects of a communications manager 915, a communications manager 1015, or a communications manager 1210 described herein. The communications manager 1105 may include a configuration manager 1110, a data manager 1115, a sidelink manager 1120, a sub-channel manager 1125, an access manager 1130, a state manager 1135, a monitoring manager 1140, a resource manager 1145, an indication manager 1150, a message manager 1155, an information manager 1160, and a periodic window manager 1165. Each of these modules may communicate, directly or indirectly, with one another (e.g., via one or more buses).

The configuration manager 1110 may receive, from a second UE, a configuration for receipt of a sidelink (e.g., reverse sidelink) resource pool message.

In some cases, the resource pool occupies resources of a first physical sidelink shared channel reserved by the second UE and resources of a second physical sidelink shared channel reserved by the second UE.

In some cases, the sidelink communications indicates the resource pool and a second resource pool, where the resource pool occupies resources of a first physical sidelink shared channel reserved by the second UE and the second resource pool occupies resources of a second physical sidelink shared channel reserved by the second UE.

In some cases, the sidelink communications includes a reservation for a first physical sidelink shared channel and a reservation for a second physical sidelink shared channel, and where a sidelink communication from the first UE includes a reservation for the second physical sidelink shared channel. In some cases, the resource pool includes non-orthogonal resources.

The data manager 1115 may determine that the first UE has information to be transmitted to the second UE via sidelink communications. In some examples, the data manager 1115 may transmit the information to the second UE over the sub-channel of the resource pool via sidelink communications.

In some examples, transmitting, over the sub-channel of the resource pool and via sidelink communications, the information multiplexed with a status report or buffer status report, where the status report or the buffer status report includes a request for the second UE to provide additional schedule transmission opportunities to the first UE.

The sidelink manager 1120 may receive, in accordance with the configuration, the sidelink resource pool message. In some examples, the sidelink manager 1120 may receive the sidelink resource pool message via at least one of first stage sidelink control information, second stage sidelink control information, a media access control element, or downlink control information.

In some cases, the sidelink resource pool message includes a system frame number, and where the local sub-channels occupy sub-channels of a physical sidelink shared channel reserved by the second UE. The sub-channel manager 1125 may identify, based on the sidelink resource pool message, a resource pool that includes sub-channels for sidelink communications to the second UE. In some examples, the sub-channel manager 1125 may identify that the sidelink resource pool message indicates random access resources to be used by the first UE in transmitting the information to the second UE, where the information is data, control information, or both.

In some examples, the sidelink manager 1120 may receive a first stage sidelink control information compatible with legacy UEs and a second stage sidelink control information that is indicative of a random access process for accessing the sub-channel of the resource pool. In some examples, the sidelink manager 1120 may receive a first stage sidelink control information that either includes one or more bits or is scrambled with bits that are indicative of a random access process for accessing the sub-channel of the resource pool.

In some examples, the sidelink manager 1120 may receive the first stage sidelink control information within a portion (e.g., only a portion) of a receiving sub-channel or with a coding rate or a transmission power that is below a threshold, or any combination thereof. In some examples, the sidelink manager 1120 may receive the sidelink resource pool message over an unlicensed band.

In some examples, the sidelink manager 1120 may receive an indication of a locally-defined granularity of the resource pool, where the locally-defined granularity includes a time domain granularity or a frequency domain granularity of sub-channels in the resource pool that differs from a network-defined granularity.

In some examples, the sidelink manager 1120 may receive an indication of a second resource pool that includes sub-channels that are available for access subsequent to the sub-channels of the resource pool, where the second resource pool occupies more sub-channels than the resource pool, and where the first UE attempts to access the sub-channel of the second resource pool by transmitting sidelink control information and a physical sidelink shared channel over sub-channels of the second resource pool.

In some examples, the sidelink manager 1120 may receive an indication of a second resource pool that includes local sub-channels that are available for access subsequent to an availability of the sub-channels of the resource pool, where a quantity of the local sub-channels exceeds a quantity of the sub-channels of the resource pool. In some examples, the sidelink manager 1120 may transmit a first stage sidelink control information to occupy a local sub-channel of the second resource pool.

The access manager 1130 may attempt to access a sub-channel of the resource pool in order to transmit the information to the second UE via sidelink communications.

In some cases, the sub-channels of the resource pool include M sub-channels. In some cases, the sub-channel corresponds to the randomly selected integer when the randomly selected integer is less than or equal to M. In some examples, the access manager 1130 may randomly select an integer between 1 and M to access the sub-channel from the M sub-channels that corresponds to the randomly selected integer.

In some examples, the access manager 1130 may randomly select an integer between 1 and N, where the sidelink resource pool message indicates a value for N that is greater than M based on a contention window access protocol. In some examples, the access manager 1130 may calculate a difference of the randomly selected integer and M when the randomly selected integer is greater than M.

In some examples, the access manager 1130 may use the calculated difference as an updated contention window for access in a subsequent resource pool. In some examples, the access manager 1130 may increase a value of N based on an observed or predicted congestion over the resource pool. In some examples, the access manager 1130 may select a non-zero integer N' for a re-entry UE.

In some examples, the access manager 1130 may randomly select an integer between 1 and N'. In some examples, the access manager 1130 may add the randomly selected integer to a current contention window.

The resource manager 1145 may identify a resource pool that includes sub-channels for sidelink communications to the second UE. In some cases, the resource pool includes non-orthogonal resources.

In some cases, the sidelink communications specifies a random access process for the first UE to access a sub-channel of the resource pool to transmit data or control information, or both.

In some cases, the resource pool occupies resources of a first physical sidelink shared channel reserved by the second UE and resources of a second physical sidelink shared channel reserved by the second UE.

In some cases, the sidelink communications indicates the resource pool and a second resource pool, where the resource pool occupies resources of a first physical sidelink shared channel reserved by the second UE and the second resource pool occupies resources of a second physical sidelink shared channel reserved by the second UE.

In some cases, the sidelink communications includes a reservation for a first physical sidelink shared channel and a reservation for a second physical sidelink shared channel, and where a sidelink communication from the first UE includes a reservation for the second physical sidelink shared channel.

The indication manager 1150 may configure a sidelink resource pool message that indicates the resource pool.

The message manager 1155 may transmit, via groupcast to the first UE, the sidelink resource pool message. In some examples, the message manager 1155 may transmit the sidelink resource pool message via at least one of first stage sidelink control information, second stage sidelink control information, a media access control element, or downlink control information.

In some examples, the message manager 1155 may transmit a first stage sidelink control information compatible with legacy UEs and a second stage sidelink control information that is indicative of a random access process for accessing the sub-channel of the resource pool. In some examples, the message manager 1155 may transmit a first stage sidelink control information that either includes one or more bits or is scrambled with bits that are indicative of a random access process for accessing the sub-channel of the resource pool.

In some examples, the message manager 1155 may transmit the first stage sidelink control information within a portion (e.g., only a portion) of a receiving sub-channel or with a coding rate or a transmission power that is below a threshold, or any combination thereof. In some examples, the message manager 1155 may transmit the sidelink resource pool message over an unlicensed band.

In some examples, the message manager 1155 may transmit an indication of a locally-defined granularity of the resource pool, where the locally-defined granularity includes a time domain granularity or a frequency domain granularity of sub-channels in the resource pool that differs from a network-defined granularity. In some examples, the message manager 1155 may transmit an indication of a second resource pool that includes sub-channels that are available for access subsequent to the sub-channels of the resource pool, where the second resource pool occupies more sub-channels than the resource pool.

In some examples, the message manager 1155 may transmit an indication of a second resource pool that includes local sub-channels that are available for access subsequent to an availability of the sub-channels of the resource pool, where a quantity of the local sub-channels exceeds a quantity of the sub-channels of the resource pool.

In some cases, the sidelink resource pool message includes a system frame number, and where the local sub-channels occupy sub-channels of a physical sidelink shared channel reserved by the second UE.

In some cases, the state manager 1135 may enter a low-power mode after transmitting the information.

The monitoring manager 1140 may monitor for the sidelink resource pool message from the second UE during a periodic window, where the configuration is indicative of the periodic window. In some cases, the periodic window includes a predetermined window length and a predetermined periodicity.

The information manager 1160 may receive information from the first UE over a sub-channel of the resource pool via sidelink communications.

In some examples, receiving, over a sub-channel of the resource pool and via sidelink communications, information from the first UE that is multiplexed with a status report or buffer status report, where the status report or the buffer status report includes a request for the second UE to provide additional schedule transmission opportunities to the first UE.

The periodic window manager 1165 may transmit, to the first UE, a configuration for receipt of the sidelink resource pool message, where the configuration indicates a periodic window during which the sidelink resource pool message is transmitted.

Figure 12:
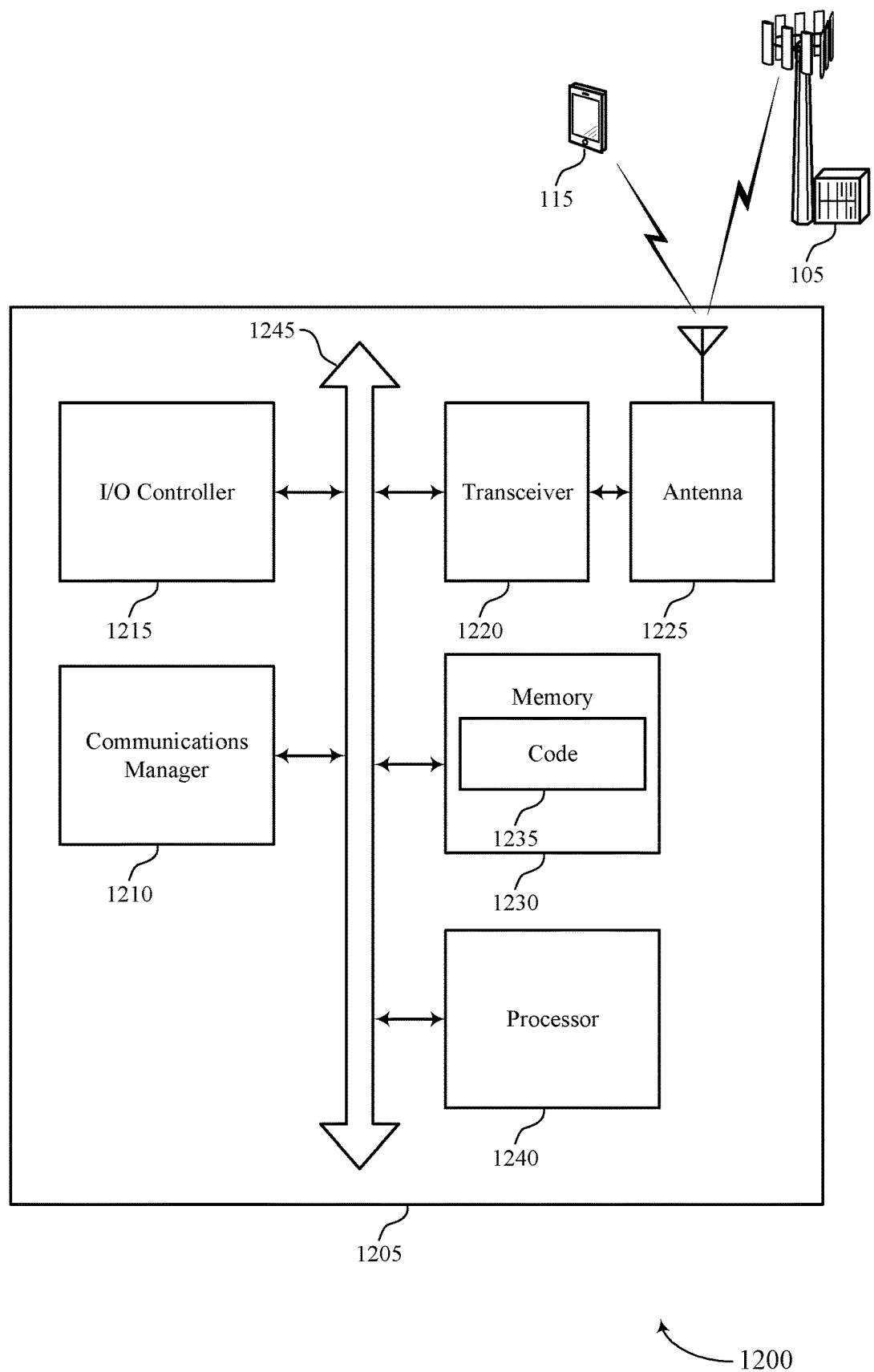
FIG. 12 shows a diagram of a system including a device that supports resource pool-based communications for sidelink in accordance with aspects of the present disclosure.

FIG. 12 shows a diagram of a system 1200 including a device 1205 that supports resource pool-based communications (e.g., reverse sidelink communications) for sidelink in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a second UE, a configuration for receipt of a sidelink (e.g., reverse sidelink) resource pool message, determine that the first UE has information to be transmitted to the second UE via sidelink communications, receive, in accordance with the configuration, the sidelink resource pool message, identify, based on the sidelink resource pool message, a resource pool that includes sub-channels for sidelink communications to the second UE, and attempt to access a sub-channel of the resource pool in order to transmit the information to the second UE via sidelink communications. The communications manager 1210 may also identify a resource pool that includes sub-channels for sidelink communications to the second UE, configure a sidelink resource pool message that indicates the resource pool, and transmit, via groupcast to the first UE, the sidelink resource pool message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting link communications for sidelink).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
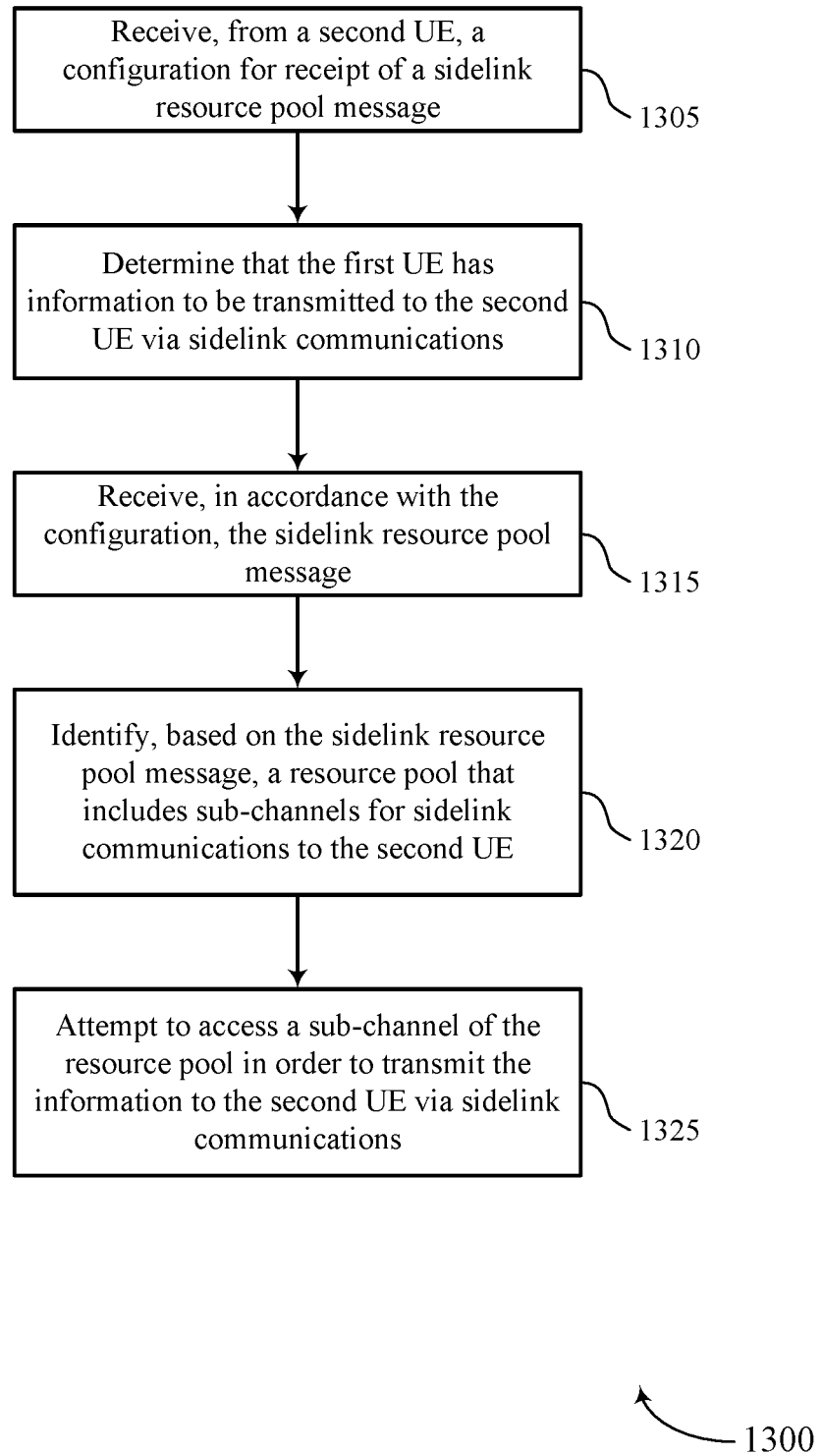
FIGS. 13 through 16 show flowcharts illustrating methods that support resource pool-based communications for sidelink in accordance with aspects of the present disclosure.

FIG. 13 shows a flowchart illustrating a method 1300 that supports resource pool-based communications (e.g., reverse sidelink communications) for sidelink in accordance with aspects of the present disclosure. The operations of method 1300 may be implemented by a UE 115 or its components as described herein. For example, the operations of method 1300 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a second UE, a configuration for receipt of a sidelink (e.g., reverse sidelink) resource pool message. The operations of 1305 may be performed according to the methods described herein. In some examples, aspects of the operations of 1305 may be performed by a configuration manager as described with reference to FIGS. 9 through 12.

At 1310, the UE may determine that the first UE has information to be transmitted to the second UE via sidelink communications. The operations of 1310 may be performed according to the methods described herein. In some examples, aspects of the operations of 1310 may be performed by a data manager as described with reference to FIGS. 9 through 12.

At 1315, the UE may receive, in accordance with the configuration, the sidelink resource pool message. The operations of 1315 may be performed according to the methods described herein. In some examples, aspects of the operations of 1315 may be performed by a sidelink manager as described with reference to FIGS. 9 through 12.

At 1320, the UE may identify, based on the sidelink resource pool message, a resource pool that includes sub-channels for sidelink communications to the second UE. The operations of 1320 may be performed according to the methods described herein. In some examples, aspects of the operations of 1320 may be performed by a sub-channel manager as described with reference to FIGS. 9 through 12.

At 1325, the UE may attempt to access a sub-channel of the resource pool in order to transmit the information to the second UE via sidelink communications. The operations of 1325 may be performed according to the methods described herein. In some examples, aspects of the operations of 1325 may be performed by an access manager as described with reference to FIGS. 9 through 12.

Figure 14:
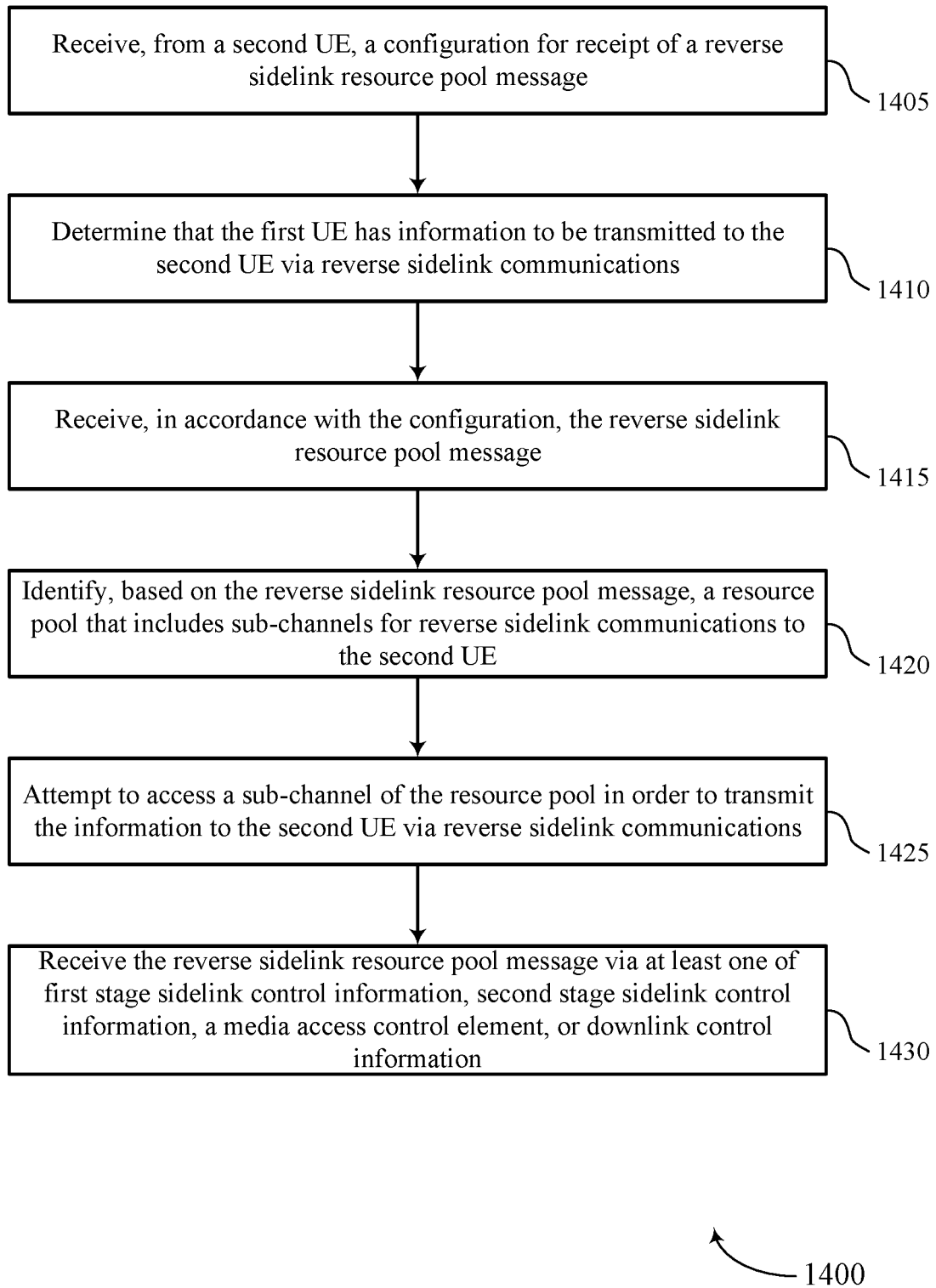

FIG. 14 shows a flowchart illustrating a method 1400 that supports resource pool-based communications (e.g., reverse sidelink communications) for sidelink in accordance with aspects of the present disclosure. The operations of method 1400 may be implemented by a UE 115 or its components as described herein. For example, the operations of method 1400 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a second UE, a configuration for receipt of a sidelink resource pool message. The operations of 1405 may be performed according to the methods described herein. In some examples, aspects of the operations of 1405 may be performed by a configuration manager as described with reference to FIGS. 9 through 12.

At 1410, the UE may determine that the first UE has information to be transmitted to the second UE via sidelink communications. The operations of 1410 may be performed according to the methods described herein. In some examples, aspects of the operations of 1410 may be performed by a data manager as described with reference to FIGS. 9 through 12.

At 1415, the UE may receive, in accordance with the configuration, the sidelink resource pool message. The operations of 1415 may be performed according to the methods described herein. In some examples, aspects of the operations of 1415 may be performed by a sidelink manager as described with reference to FIGS. 9 through 12.

At 1420, the UE may identify, based on the sidelink (e.g., reverse sidelink) resource pool message, a resource pool that includes sub-channels for sidelink communications to the second UE. The operations of 1420 may be performed according to the methods described herein. In some examples, aspects of the operations of 1420 may be performed by a sub-channel manager as described with reference to FIGS. 9 through 12.

At 1425, the UE may attempt to access a sub-channel of the resource pool in order to transmit the information to the second UE via sidelink communications. The operations of 1425 may be performed according to the methods described herein. In some examples, aspects of the operations of 1425 may be performed by an access manager as described with reference to FIGS. 9 through 12.

At 1430, the UE may receive the sidelink resource pool message via at least one of first stage sidelink control information, second stage sidelink control information, a media access control element, or downlink control information. The operations of 1430 may be performed according to the methods described herein. In some examples, aspects of the operations of 1430 may be performed by a sidelink manager as described with reference to FIGS. 9 through 12.

Figure 15:
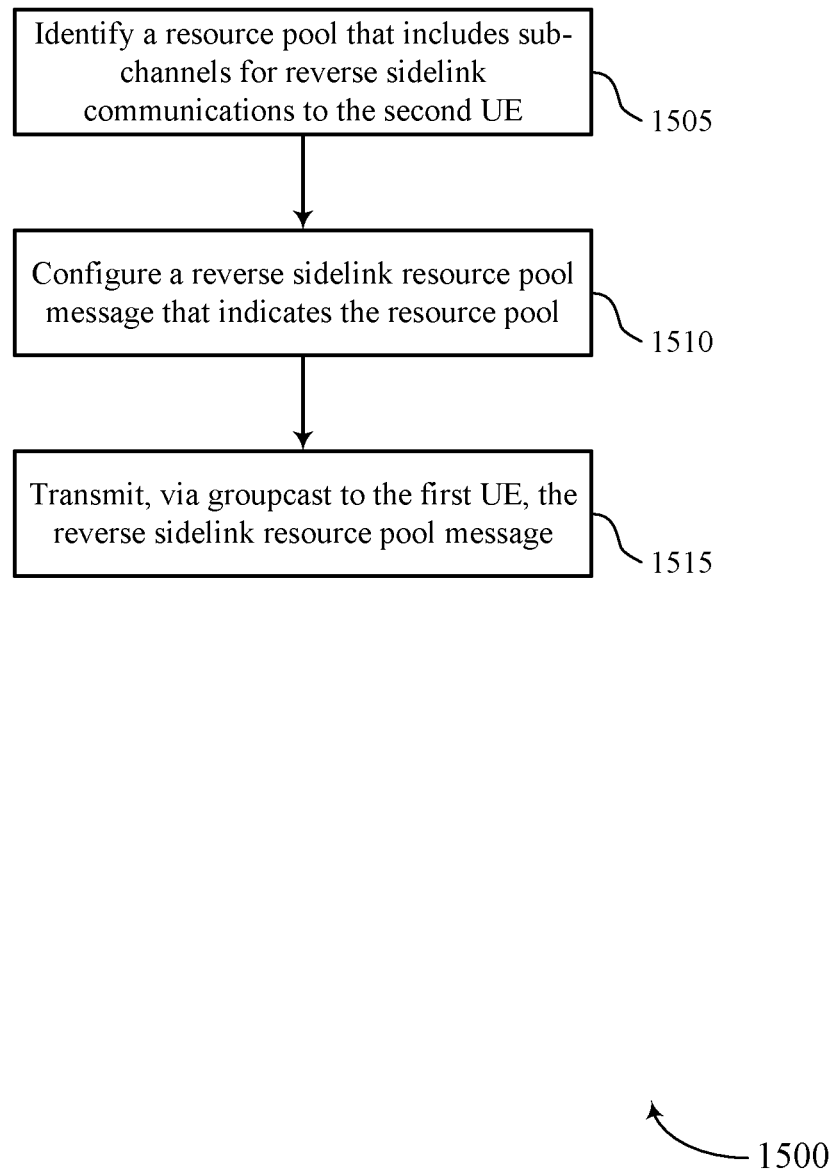

FIG. 15 shows a flowchart illustrating a method 1500 that supports resource pool-based communications (e.g., reverse sidelink communications) for sidelink in accordance with aspects of the present disclosure. The operations of method 1500 may be implemented by a UE 115 or its components as described herein. For example, the operations of method 1500 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1505, the UE may identify a resource pool that includes sub-channels for sidelink communications to the second UE. The operations of 1505 may be performed according to the methods described herein. In some examples, aspects of the operations of 1505 may be performed by a resource manager as described with reference to FIGS. 9 through 12.

At 1510, the UE may configure a sidelink (e.g., reverse sidelink) resource pool message that indicates the resource pool. The operations of 1510 may be performed according to the methods described herein. In some examples, aspects of the operations of 1510 may be performed by an indication manager as described with reference to FIGS. 9 through 12.

At 1515, the UE may transmit, via groupcast to the first UE, the sidelink (e.g., reverse sidelink) resource pool message. The operations of 1515 may be performed according to the methods described herein. In some examples, aspects of the operations of 1515 may be performed by a message manager as described with reference to FIGS. 9 through 12.

Figure 16:
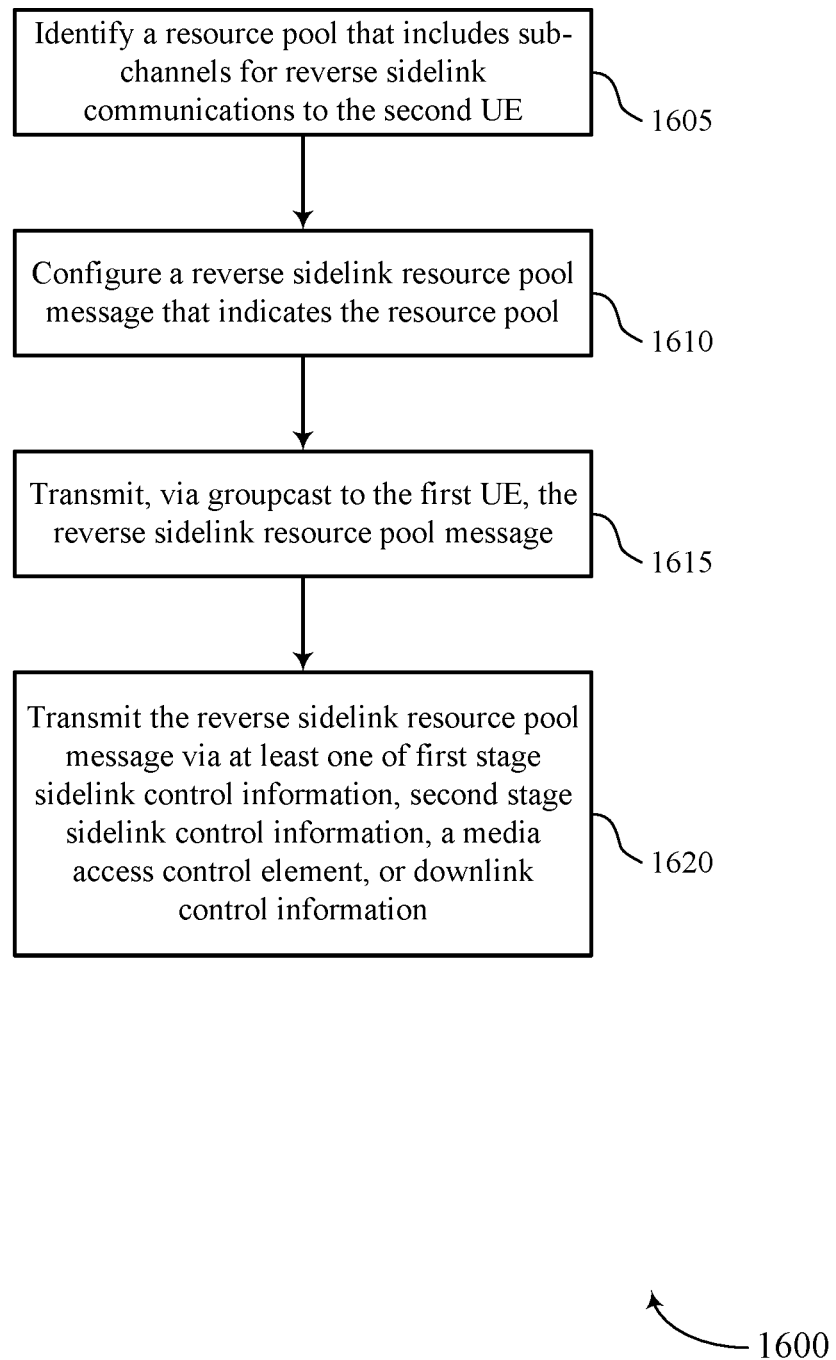

FIG. 16 shows a flowchart illustrating a method 1600 that supports resource pool-based communications for sidelink in accordance with aspects of the present disclosure. The operations of method 1600 may be implemented by a UE 115 or its components as described herein. For example, the operations of method 1600 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1605, the UE may identify a resource pool that includes sub-channels for sidelink communications to the second UE. The operations of 1605 may be performed according to the methods described herein. In some examples, aspects of the operations of 1605 may be performed by a resource manager as described with reference to FIGS. 9 through 12.

At 1610, the UE may configure a sidelink (e.g., reverse sidelink) resource pool message that indicates the resource pool. The operations of 1610 may be performed according to the methods described herein. In some examples, aspects of the operations of 1610 may be performed by an indication manager as described with reference to FIGS. 9 through 12.

At 1615, the UE may transmit, via groupcast to the first UE, the sidelink resource pool message. The operations of 1615 may be performed according to the methods described herein. In some examples, aspects of the operations of 1615 may be performed by a message manager as described with reference to FIGS. 9 through 12.

At 1620, the UE may transmit the sidelink resource pool message via at least one of first stage sidelink control information, second stage sidelink control information, a media access control element, or downlink control information. The operations of 1620 may be performed according to the methods described herein. In some examples, aspects of the operations of 1620 may be performed by a message manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: receiving, from a second UE, a configuration for receipt of a sidelink resource pool message; determining that the first UE has information to be transmitted to the second UE via sidelink communications; receiving, in accordance with the configuration, the sidelink resource pool message; identifying, based at least in part on the sidelink resource pool message, a resource pool that includes sub-channels for sidelink communications to the second UE; and attempting to access a sub-channel of the resource pool in order to transmit the information to the second UE via sidelink communications.

Aspect 2: The method of aspect 1, wherein receiving the sidelink resource pool message comprises: receiving the sidelink resource pool message via at least one of first stage sidelink control information, second stage sidelink control information, a media access control element, or downlink control information.

Aspect 3: The method of any of aspects 1 through 2, wherein receiving the sidelink resource pool message comprises: receiving a first stage sidelink control information compatible with legacy UEs and a second stage sidelink control information that is indicative of a random access process for accessing the sub-channel of the resource pool.

Aspect 4: The method of any of aspects 1 through 3, wherein receiving the sidelink resource pool message comprises: receiving a first stage sidelink control information that either includes one or more bits or is scrambled with bits that are indicative of a random access process for accessing the sub-channel of the resource pool.

Aspect 5: The method of aspect 4, wherein receiving the first stage sidelink control information comprises: receiving the first stage sidelink control information within a portion of a receiving sub-channel or with a coding rate or a transmission power that is below a threshold, or any combination thereof.

Aspect 6: The method of any of aspects 1 through 5, further comprising: transmitting the information to the second UE over the sub-channel of the resource pool via sidelink communications; and entering a low-power mode after transmitting the information.

Aspect 7: The method of any of aspects 1 through 6, further comprising: transmitting, over the sub-channel of the resource pool and via sidelink communications, the information multiplexed with a status report or buffer status report, wherein the status report or the buffer status report comprises a request for the second UE to provide additional schedule transmission opportunities to the first UE.

Aspect 8: The method of any of aspects 1 through 7, further comprising: monitoring for the sidelink resource pool message from the second UE during a periodic window, wherein the configuration is indicative of the periodic window.

Aspect 9: The method of aspect 8, wherein the periodic window comprises a predetermined window length and a predetermined periodicity.

Aspect 10: The method of any of aspects 1 through 9, wherein identifying the resource pool comprises: identifying that the sidelink resource pool message indicates random access resources to be used by the first UE in transmitting the information to the second UE, wherein the information is data, control information, or both.

Aspect 11: The method of any of aspects 1 through 10, wherein receiving the sidelink resource pool message comprises: receiving the sidelink resource pool message over an unlicensed band.

Aspect 12: The method of any of aspects 1 through 11, wherein receiving the sidelink resource pool message comprises: receiving an indication of a locally-defined granularity of the resource pool, wherein the locally-defined granularity includes a time domain granularity or a frequency domain granularity of sub-channels in the resource pool that differs from a network-defined granularity.

Aspect 13: The method of any of aspects 1 through 12, wherein the sub-channels of the resource pool comprise M sub-channels.

Aspect 14: The method of aspect 13, wherein attempting to access the sub-channel of the resource pool comprises: randomly selecting an integer between 1 and M to access the sub-channel from the M sub-channels that corresponds to the randomly selected integer.

Aspect 15: The method of any of aspects 1 through 14, wherein attempting to access the sub-channel of the resource pool comprises: randomly selecting an integer between 1 and N, wherein the sidelink resource pool message indicates a value for N that is greater than M based at least in part on a contention window access protocol.

Aspect 16: The method of aspect 15, wherein the sub-channel corresponds to the randomly selected integer when the randomly selected integer is less than or equal to M.

Aspect 17: The method of any of aspects 15 through 16, wherein the sub-channel corresponds to the randomly selected integer when the randomly selected integer is less than or equal to M.

Aspect 18: The method of any of aspects 15 through 17, further comprising: calculating a difference of the randomly selected integer and M when the randomly selected integer is greater than M; and using the calculated difference as an updated contention window for access in a subsequent resource pool.

Aspect 19: The method of any of aspects 15 through 18, further comprising: increasing a value of N based at least in part on an observed or predicted congestion over the resource pool; and selecting a non-zero integer N' for a re-entry UE.

Aspect 20: The method of aspect 19, further comprising: randomly selecting an integer between 1 and N'; and adding the randomly selected integer to a current contention window.

Aspect 21: The method of any of aspects 1 through 20, wherein receiving the sidelink resource pool message comprises: receiving an indication of a second resource pool that includes sub-channels that are available for access subsequent to the sub-channels of the resource pool, wherein the second resource pool occupies more sub-channels than the resource pool, and wherein the first UE attempts to access the sub-channel of the second resource pool by transmitting sidelink control information and a physical sidelink shared channel over sub-channels of the second resource pool.

Aspect 22: The method of any of aspects 1 through 21, wherein receiving the sidelink resource pool message comprises: receiving an indication of a second resource pool that includes local sub-channels that are available for access subsequent to an availability of the sub-channels of the resource pool, wherein a quantity of the local sub-channels exceeds a quantity of the sub-channels of the resource pool.

Aspect 23: The method of aspect 22, wherein the sidelink resource pool message comprises a system frame number, and the local sub-channels occupy sub-channels of a physical sidelink shared channel reserved by the second UE.

Aspect 24: The method of any of aspects 22 through 23, further comprising: transmitting a first stage sidelink control information to occupy a local sub-channel of the second resource pool.

Aspect 25: The method of any of aspects 1 through 24, wherein the resource pool occupies resources of a first physical sidelink shared channel reserved by the second UE and resources of a second physical sidelink shared channel reserved by the second UE.

Aspect 26: The method of any of aspects 1 through 25, wherein the sidelink communications indicates the resource pool and a second resource pool, the resource pool occupies resources of a first physical sidelink shared channel reserved by the second UE and the second resource pool occupies resources of a second physical sidelink shared channel reserved by the second UE.

Aspect 27: The method of any of aspects 1 through 26, wherein the sidelink communications comprises a reservation for a first physical sidelink shared channel and a reservation for a second physical sidelink shared channel, and a sidelink communication from the first UE comprises a reservation for the second physical sidelink shared channel.

Aspect 28: The method of any of aspects 1 through 27, wherein the resource pool comprises non-orthogonal resources.

Aspect 29: A method for wireless communications at a second UE in sidelink communication with a first UE, comprising: identifying a resource pool that includes sub-channels for sidelink communications to the second UE; configuring a sidelink resource pool message that indicates the resource pool; and transmitting, via groupcast to the first UE, the sidelink resource pool message.

Aspect 30: The method of aspect 29, wherein transmitting the sidelink resource pool message comprises: transmitting the sidelink resource pool message via at least one of first stage sidelink control information, second stage sidelink control information, a media access control element, or downlink control information.

Aspect 31: The method of any of aspects 29 through 30, wherein transmitting the sidelink resource pool message comprises: transmitting a first stage sidelink control information compatible with legacy UEs and a second stage sidelink control information that is indicative of a random access process for accessing the sub-channel of the resource pool.

Aspect 32: The method of any of aspects 29 through 31, wherein transmitting the sidelink resource pool message comprises: transmitting a first stage sidelink control information that either includes one or more bits or is scrambled with bits that are indicative of a random access process for accessing the sub-channel of the resource pool.

Aspect 33: The method of aspect 32, wherein transmitting the first stage sidelink control information comprises: transmitting the first stage sidelink control information within a portion of a receiving sub-channel or with a coding rate or a transmission power that is below a threshold, or any combination thereof.

Aspect 34: The method of any of aspects 29 through 33, further comprising: receiving information from the first UE over a sub-channel of the resource pool via sidelink communications.

Aspect 35: The method of any of aspects 29 through 34, further comprising: receiving, over a sub-channel of the resource pool and via sidelink communications, information from the first UE that is multiplexed with a status report or buffer status report, wherein the status report or the buffer status report comprises a request for the second UE to provide additional schedule transmission opportunities to the first UE.

Aspect 36: The method of any of aspects 29 through 35, further comprising: transmitting, to the first UE, a configuration for receipt of the sidelink resource pool message, wherein the configuration indicates a periodic window during which the sidelink resource pool message is transmitted.

Aspect 37: The method of aspect 36, wherein the periodic window comprises a predetermined window length and a predetermined periodicity.

Aspect 38: The method of any of aspects 29 through 37, wherein the sidelink communications specifies a random access process for the first UE to access a sub-channel of the resource pool to transmit data or control information, or both.

Aspect 39: The method of any of aspects 29 through 38, wherein transmitting the sidelink resource pool message comprises: transmitting the sidelink resource pool message over an unlicensed band.

Aspect 40: The method of any of aspects 29 through 39, wherein transmitting the sidelink resource pool message comprises: transmitting an indication of a locally-defined granularity of the resource pool, wherein the locally-defined granularity includes a time domain granularity or a frequency domain granularity of sub-channels in the resource pool that differs from a network-defined granularity.

Aspect 41: The method of any of aspects 29 through 40, wherein transmitting the sidelink resource pool message comprises: transmitting an indication of a second resource pool that includes sub-channels that are available for access subsequent to the sub-channels of the resource pool, wherein the second resource pool occupies more sub-channels than the resource pool.

Aspect 42: The method of any of aspects 29 through 41, wherein transmitting the sidelink resource pool message comprises: transmitting an indication of a second resource pool that includes local sub-channels that are available for access subsequent to an availability of the sub-channels of the resource pool, wherein a quantity of the local sub-channels exceeds a quantity of the sub-channels of the resource pool.

Aspect 43: The method of aspect 42, wherein the sidelink resource pool message comprises a system frame number, and the local sub-channels occupy sub-channels of a physical sidelink shared channel reserved by the second UE.

Aspect 44: The method of any of aspects 29 through 43, wherein the resource pool occupies resources of a first physical sidelink shared channel reserved by the second UE and resources of a second physical sidelink shared channel reserved by the second UE.

Aspect 45: The method of any of aspects 29 through 44, wherein the sidelink communications indicates the resource pool and a second resource pool, the resource pool occupies resources of a first physical sidelink shared channel reserved by the second UE and the second resource pool occupies resources of a second physical sidelink shared channel reserved by the second UE.

Aspect 46: The method of any of aspects 29 through 45, wherein the sidelink communications comprises a reservation for a first physical sidelink shared channel and a reservation for a second physical sidelink shared channel, and a sidelink communication from the first UE comprises a reservation for the second physical sidelink shared channel.

Aspect 47: The method of any of aspects 29 through 46, wherein the sidelink resource pool message comprises a reverse sidelink resource pool message that indicates the resource pool that includes sub-channels for reverse sidelink communications from the first UE to the second UE, and wherein the resource pool comprises non-orthogonal resources.

Aspect 48: The method of any of aspects 29 through 47, wherein the configuration comprises a star topology configuration that includes the second UE configured as an information source for a plurality of peripheral UEs that include the first UE.

Aspect 49: An apparatus for wireless communications at a first UE, comprising a processor; memory coupled with the processor; and instructions stored in the memory and executable by the processor to cause the apparatus to perform a method of any of aspects 1 through 28.

Aspect 50: An apparatus for wireless communications at a first UE, comprising at least one means for performing a method of any of aspects 1 through 28.

Aspect 51: A non-transitory computer-readable medium storing code for wireless communications at a first UE, the code comprising instructions executable by a processor to perform a method of any of aspects 1 through 28.

Aspect 52: An apparatus for wireless communications at a second UE in sidelink communication with a first UE, comprising a processor; memory coupled with the processor; and instructions stored in the memory and executable by the processor to cause the apparatus to perform a method of any of aspects 29 through 48.

Aspect 53: An apparatus for wireless communications at a second UE in sidelink communication with a first UE, comprising at least one means for performing a method of any of aspects 29 through 48.

Aspect 54: A non-transitory computer-readable medium storing code for wireless communications at a second UE in sidelink communication with a first UE, the code comprising instructions executable by a processor to perform a method of any of aspects 29 through 48.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, from a second UE, a configuration for receipt of a sidelink resource pool message;
   determining that the first UE has information to be transmitted to the second UE via sidelink communications;
   receiving, in accordance with the configuration, the sidelink resource pool message, wherein receiving the sidelink resource pool message comprises receiving an indication of a locally-defined granularity of a resource pool, wherein the locally-defined granularity comprises a time domain granularity or a frequency domain granularity of sub-channels in the resource pool that differs from a network-defined granularity;

identifying, based at least in part on the sidelink resource pool message, the resource pool, which includes sub-channels for sidelink communications to the second UE; and attempting to access a sub-channel of the resource pool in order to transmit the information to the second UE via sidelink communications.

2. The method of claim 1, wherein receiving the sidelink resource pool message comprises:
receiving the sidelink resource pool message via at least one of first stage sidelink control information, second stage sidelink control information, a media access control element, or downlink control information.

3. The method of claim 1, wherein receiving the sidelink resource pool message comprises:
receiving a first stage sidelink control information compatible with legacy UEs and a second stage sidelink control information that is indicative of a random access process for accessing the sub-channel of the resource pool.

4. The method of claim 1, wherein receiving the sidelink resource pool message comprises:
receiving a first stage sidelink control information that either includes one or more bits or is scrambled with bits that are indicative of a random access process for accessing the sub-channel of the resource pool; and
receiving the first stage sidelink control information within a portion of a receiving sub-channel or with a coding rate or a transmission power that is below a threshold, or any combination thereof.

5. The method of claim 1, further comprising:
transmitting the information to the second UE over the sub-channel of the resource pool via sidelink communications; and
entering a low-power mode after transmitting the information.

6. The method of claim 1, further comprising:
transmitting, over the sub-channel of the resource pool and via sidelink communications, the information multiplexed with a status report or buffer status report, wherein the status report or the buffer status report comprises a request for the second UE to provide additional schedule transmission opportunities to the first UE.

7. The method of claim 1, further comprising:
monitoring for the sidelink resource pool message from the second UE during a periodic window, wherein the configuration is indicative of the periodic window, wherein the periodic window comprises a predetermined window length and a predetermined periodicity.

8. The method of claim 1, wherein identifying the resource pool comprises:
identifying that the sidelink resource pool message indicates random access resources to be used by the first UE in transmitting the information to the second UE, wherein the information is data, control information, or both.

9. The method of claim 1, wherein receiving the sidelink resource pool message comprises:
receiving the sidelink resource pool message over an unlicensed band.

10. The method of claim 1, wherein attempting to access the sub-channel of the resource pool comprises:
randomly selecting an integer between 1 and M to access the sub-channel from the M sub-channels that corresponds to the randomly selected integer, wherein the sub-channels of the resource pool comprise M sub-channels.

11. The method of claim 1, wherein attempting to access the sub-channel of the resource pool comprises:
randomly selecting an integer between 1 and N, wherein the sidelink resource pool message indicates a value for N that is greater than M based at least in part on a contention window access protocol, wherein the sub-channel corresponds to the randomly selected integer when the randomly selected integer is less than or equal to M.

12. The method of claim 11, further comprising:
calculating a difference of the randomly selected integer and M when the randomly selected integer is greater than M; and
using the calculated difference as an updated contention window for access in a subsequent resource pool.

13. The method of claim 11, further comprising:
increasing a value of N based at least in part on an observed or predicted congestion over the resource pool;
selecting a non-zero integer N' for a re-entry UE;
randomly selecting an integer between 1 and N'; and
adding the randomly selected integer to a current contention window.

14. The method of claim 1, wherein receiving the sidelink resource pool message comprises:
receiving an indication of a second resource pool that includes sub-channels that are available for access subsequent to the sub-channels of the resource pool, wherein the second resource pool occupies more sub-channels than the resource pool, and wherein the first UE attempts to access the sub-channel of the second resource pool by transmitting sidelink control information and a physical sidelink shared channel over sub-channels of the second resource pool.

15. The method of claim 1, wherein receiving the sidelink resource pool message comprises:
receiving an indication of a second resource pool that includes local sub-channels that are available for access subsequent to an availability of the sub-channels of the resource pool, wherein a quantity of the local sub-channels exceeds a quantity of the sub-channels of the resource pool.

16. The method of claim 15, further comprising:
transmitting a first stage sidelink control information to occupy a local sub-channel of the second resource pool, wherein the sidelink resource pool message comprises a system frame number, and wherein the local sub-channels occupy sub-channels of a physical sidelink shared channel reserved by the second UE.

17. The method of claim 1, wherein the resource pool occupies resources of a first physical sidelink shared channel reserved by the second UE and resources of a second physical sidelink shared channel reserved by the second UE.

18. The method of claim 1, wherein the sidelink communications indicates the resource pool and a second resource pool, wherein the resource pool occupies resources of a first physical sidelink shared channel reserved by the second UE and the second resource pool occupies resources of a second physical sidelink shared channel reserved by the second UE.

19. The method of claim 1, wherein the sidelink communications comprises a reservation for a first physical sidelink shared channel and a reservation for a second physical sidelink shared channel, and wherein a sidelink communication from the first UE comprises a reservation for the second physical sidelink shared channel.

20. The method of claim 1, wherein the sidelink resource pool message comprises a reverse sidelink resource pool message that indicates the resource pool that includes sub-channels for reverse sidelink communications from the first UE to the second UE, and wherein the resource pool comprises non-orthogonal resources.

21. The method of claim 1, wherein the configuration comprises a star topology configuration that includes the second UE configured as an information source for a plurality of peripheral UEs that include the first UE.

22. A method for wireless communications at a second user equipment (UE) in sidelink communication with a first UE, comprising:
identifying a resource pool that includes sub-channels for reverse sidelink communications from the first UE to the second UE;
configuring a sidelink resource pool message that indicates the resource pool, wherein the sidelink resource pool message comprises an indication of a locally-defined granularity of the resource pool, wherein the locally-defined granularity comprises a time domain granularity or a frequency domain granularity of sub-channels in the resource pool that differs from a network-defined granularity; and
transmitting, via groupcast to the first UE, the sidelink resource pool message.

23. The method of claim 22, wherein transmitting the sidelink resource pool message comprises:
transmitting the sidelink resource pool message via at least one of first stage sidelink control information, second stage sidelink control information, a media access control element, or downlink control information.

24. The method of claim 22, wherein transmitting the sidelink resource pool message comprises:
transmitting a first stage sidelink control information compatible with legacy UEs and a second stage sidelink control information that is indicative of a random access process for accessing the sub-channel of the resource pool.

25. The method of claim 22, wherein transmitting the sidelink resource pool message comprises:
transmitting a first stage sidelink control information that either includes one or more bits or is scrambled with bits that are indicative of a random access process for accessing the sub-channel of the resource pool; and
transmitting the first stage sidelink control information within a portion of a receiving sub-channel or with a coding rate or a transmission power that is below a threshold, or any combination thereof.

26. The method of claim 22, further comprising:
receiving information from the first UE over a sub-channel of the resource pool via sidelink communications.

27. The method of claim 22, further comprising:
transmitting, to the first UE, a configuration for receipt of the sidelink resource pool message, wherein the configuration indicates a periodic window during which the sidelink resource pool message is transmitted, wherein the configuration comprises a star topology configuration that includes the second UE configured as an information source for a plurality of peripheral UEs that include the first UE, and wherein the sidelink resource pool message comprises a reverse sidelink resource pool message that indicates the resource pool that includes sub-channels for reverse sidelink communications from the first UE to the second UE.

28. An apparatus for wireless communications at a first user equipment (UE), comprising:
one or more processors;
one or more memories coupled with the one or more processors; and
instructions stored in the one or more memories and executable by the one or more processors to cause the apparatus to:
receive, from a second UE, a configuration for receipt of a sidelink resource pool message;
determine that the first UE has information to be transmitted to the second UE via sidelink communications;
receive, in accordance with the configuration, the sidelink resource pool message, wherein the sidelink resource pool message comprises an indication of a locally-defined granularity of a resource pool, wherein the locally-defined granularity comprises a time domain granularity or a frequency domain granularity of sub-channels in the resource pool that differs from a network-defined granularity;
identify, based at least in part on the sidelink resource pool message, the resource pool, which includes sub-channels for sidelink communications to the second UE; and
attempt to access a sub-channel of the resource pool in order to transmit the information to the second UE via sidelink communications.

29. An apparatus for wireless communications at a second user equipment (UE) in sidelink communication with a first UE, comprising:
one or more processors;
one or more memories coupled with the one or more processors; and
instructions stored in the one or more memories and executable by the one or more processors to cause the apparatus to:
identify a resource pool that includes sub-channels for reverse sidelink communications from the first UE to the second UE;
configure a sidelink resource pool message that indicates the resource pool, wherein the sidelink resource pool message comprises an indication of a locally-defined granularity of the resource pool, wherein the locally-defined granularity comprises a time domain granularity or a frequency domain granularity of sub-channels in the resource pool that differs from a network-defined granularity; and
transmit, via groupcast to the first UE, the sidelink resource pool message.

* * * * *